United States Patent
Matsuda et al.

(10) Patent No.: US 12,122,651 B2
(45) Date of Patent: Oct. 22, 2024

(54) MOVING BODY

(71) Applicant: Panasonic Intellectual Property Management Co., Ltd., Osaka (JP)

(72) Inventors: Shuji Matsuda, Nara (JP); Shozo Fukushima, Osaka (JP); Masaya Shitami, Fukuoka (JP); Masatomo Kitada, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 693 days.

(21) Appl. No.: 17/283,727

(22) PCT Filed: Oct. 8, 2019

(86) PCT No.: PCT/JP2019/039691
§ 371 (c)(1),
(2) Date: Apr. 8, 2021

(87) PCT Pub. No.: WO2020/080200
PCT Pub. Date: Apr. 23, 2020

(65) Prior Publication Data
US 2021/0339993 A1    Nov. 4, 2021

(30) Foreign Application Priority Data

Oct. 15, 2018 (JP) .................. 2018-194042
Oct. 15, 2018 (JP) .................. 2018-194043
(Continued)

(51) Int. Cl.
*B66F 9/06* (2006.01)
*B65G 1/04* (2006.01)
(Continued)

(52) U.S. Cl.
CPC ............ *B66F 9/063* (2013.01); *B65G 1/0471* (2013.01); *B65G 1/0492* (2013.01); *B65G 1/065* (2013.01);
(Continued)

(58) Field of Classification Search
CPC .......... B66F 9/063; B66F 3/44; B66F 9/0755; B66F 9/24; B66F 3/10; B65G 1/065;
(Continued)

(56) References Cited

U.S. PATENT DOCUMENTS

| | | | |
|---|---|---|---|
| 2016/0368710 A1 | 12/2016 | Ramankutty et al. | |
| 2018/0141752 A1 | 5/2018 | Nakanishi et al. | |
| 2023/0183002 A1* | 6/2023 | Heggebø | B65G 1/065 |
| | | | 414/279 |

FOREIGN PATENT DOCUMENTS

| | | | | |
|---|---|---|---|---|
| CN | 107445111 A | * | 12/2017 | |
| CN | 107745908 A | * | 3/2018 | B60K 1/02 |

(Continued)

OTHER PUBLICATIONS

Automated Lifting Storage Cart; Patent No. 2015134529; Document Id: WO 2015134529 A1; Date Published: Sep. 11, 2015; Inventor Name: Ramankutty Mohan, Brumm Christopher, Tipton Rodney, Mitchell Pat; (Year: 2015).*

(Continued)

*Primary Examiner* — Mahdi H Nejad
(74) *Attorney, Agent, or Firm* — Pearne & Gordon LLP

(57) ABSTRACT

A moving body includes a housing, a traction motor, a plurality of elevator motors and a battery. The traction motor allows the housing to travel along a traveling surface. The plurality of elevator motors actuates an elevator unit, the elevator unit being configured to be elevated and lowered with respect to the traveling surface. The battery supplies electric power to the traction motor and the plurality of (Continued)

elevator motors. In the moving body, the plurality of elevator motors, the traction motor, and the battery are distributed when viewed perpendicularly to the traveling surface. The moving body further comprises at least one driving wheel to support the housing on the traveling surface. The plurality of elevator motors, the traction motor, and the battery fall, in a direction perpendicular to the traveling surface, within a range defined by a diameter of the at least one driving wheel.

14 Claims, 22 Drawing Sheets

(30) Foreign Application Priority Data

| Oct. 15, 2018 | (JP) | 2018-194044 |
|---|---|---|
| Oct. 15, 2018 | (JP) | 2018-194045 |
| Oct. 15, 2018 | (JP) | 2018-194046 |

(51) Int. Cl.
| | |
|---|---|
| *B65G 1/06* | (2006.01) |
| *B66F 3/44* | (2006.01) |
| *B66F 9/075* | (2006.01) |
| *B66F 9/24* | (2006.01) |
| *B65G 1/00* | (2006.01) |
| *B65G 1/137* | (2006.01) |

(52) U.S. Cl.
CPC .......... *B66F 3/44* (2013.01); *B66F 9/0755* (2013.01); *B66F 9/24* (2013.01); *B65G 1/00* (2013.01); *B65G 1/137* (2013.01)

(58) Field of Classification Search
CPC ...... B65G 1/0492; B65G 1/00; B65G 1/0414; B65G 1/0471; B61B 13/02
See application file for complete search history.

(56) References Cited

FOREIGN PATENT DOCUMENTS

| CN | 110065759 A | * | 7/2019 | ........... B65G 1/0492 |
|---|---|---|---|---|
| CN | 110255039 A | * | 9/2019 | |
| CN | 110395518 A | * | 11/2019 | |
| CN | 110395519 A | * | 11/2019 | |
| CN | 110466926 A | * | 11/2019 | ........... B65G 1/0492 |
| CN | 111391938 A | * | 7/2020 | ........... B60W 30/095 |
| CN | 112093349 A | * | 12/2020 | ........... B65G 1/0492 |
| CN | 113443311 A | * | 9/2021 | |
| CN | 117142385 A | * | 12/2023 | |
| JP | H04-083807 U | | 7/1992 | |
| JP | H108-207754 A | | 8/1996 | |
| JP | H10-006979 A | | 1/1998 | |
| JP | 2004-194715 A | | 7/2004 | |
| JP | 2008-030650 A | | 2/2008 | |
| JP | 2012-053838 A | | 3/2012 | |
| JP | 2014-184749 A | | 10/2014 | |
| JP | 2015-016005 A | | 1/2015 | |
| JP | 2018-034932 A | | 3/2018 | |
| KR | 102393745 B1 | * | 5/2022 | |
| NO | 20220371 A1 | * | 3/2022 | |
| WO | 2015/134529 A1 | | 9/2015 | |
| WO | 2016/181627 A1 | | 11/2016 | |
| WO | 2018/008385 A1 | | 1/2018 | |

OTHER PUBLICATIONS

Automated Carrier Truck; Document Id: JP 2014184749 A; Inventor Name: Ozaki Shin; Date Published: Oct. 2, 2014; Date Filed: Mar. 21, 2013 (Year: 2014).*
Transport Device and Rack Mounted Thereon; Patent No. 2016181627; Document Id: WO 2016181627 A1; Date Published: Nov. 17, 2016; Inventor Name: Nakanishi, Tsutomu; Uemura, Takeshi; Nakao, Yoriko; A, Takahiro (Year: 2016).*
Self-Propelled Cleaner; Patent No. 2015016005; Document Id: JP 2015016005 A; Date Published: Jan. 29, 2015; Nventor Name: Okazaki Mitsuhiro; Kobayashi Tomoo; Date Filed: Jul. 9, 2013 (Year: 2015).*
Suspension device for auxiliary wheel in Self-Propelled bogie; Japanese Utility Model Application No. H2-127531 (JP H4-83807U); Inventor Name: Oaza Nakazato; Identification code: Office internal reference No. 8817-3D; a 7140-3D; 1992 Year (1992) Jul. 21 (Year: 1992).*
Autonomous Robot; Patent No. 2018008385; Document Id: WO 2018008385 A1; Date Published: Jan. 11, 2018; Inventor Name: Hayashi Kaname; Date Filed: Jun. 20, 2017 (Year: 2017).*
Self-Propelled Vacuum Cleaner; Patent No. 2004194715; Document Id: JP 2004194715 A; Date Published: Jul. 15, 2004; Inventor Name: Okubo Naoya; Sudo Keiji (Year: 2004).*
Automatic Guided Vehicle; Document Id: JP 10006979 A; Date Published: Jan. 13, 1998; Inventor Name: Ishida, Hiroteru; Date Filed: Jun. 25, 1996 (Year: 1998).*
Omnidirectional Mobile Robot for Machine Tool Workbench; Document Id: CN 106495056 A; Date Published: Mar. 15, 2017; Inventor: Duan, San-jun; Date Filed: Nov. 10, 2016 (Year: 2017).*
Transport Vehicle; Patent No. 2018034932; Document Id: JP 2018034932 A; Date Published: Mar. 8, 2018; Inventor: Yanagihara Yoji; Date Filed: Aug. 30, 2016 (Year: 2018).*
Japanese Office Action issued in Japanese Patent Application No. 2020-553096 dated Jun. 27, 2023.
International Search Report issued in Patent Application No. PCT/JP2019/039691 dated Nov. 26, 2019.
Chinese Office Action issued in Chinese Patent Application No. 201980067748.4 dated Jun. 6, 2024.

* cited by examiner

MOVING BODY

CROSS-REFERENCE TO RELATED APPLICATIONS

This application is a U.S. national stage application of the PCT International Application No. PCT/JP2019/039691 filed on Oct. 8, 2019, which claims the benefit of foreign priority of Japanese Patent Application No. 2018-194042 filed on Oct. 15, 2018, Japanese Patent Application No. 2018-194043 filed on Oct. 15, 2018, Japanese Patent Application No. 2018-194044 filed on Oct. 15, 2018, Japanese Patent Application No. 2018-194045 filed on Oct. 15, 2018, and Japanese Patent Application No. 2018-194046 filed on Oct. 15, 2018, the contents all of which are incorporated herein by reference.

TECHNICAL FIELD

The present disclosure generally relates to a moving body, and more particularly relates to a moving body configured to travel along a traveling surface.

BACKGROUND ART

Patent Literature 1 discloses an unmanned carrier vehicle (moving body) designed to travel within a traveling area in accordance with route data. The unmanned carrier vehicle is configured to travel with a burden loaded and to unload the burden. Also, this unmanned carrier vehicle has the capability of traveling, when detecting any obstacle ahead of itself while traveling, so as to circumvent the obstacle.

However, there have been no moving bodies designed to house, in its housing, a motor required for traveling, another motor required for elevating and lowering burdens loaded, and a battery which have their dimension reduced sufficiently in a direction perpendicular to the traveling surface.

CITATION LIST

Patent Literature

Patent Literature 1: JP 2012-053838 A

SUMMARY OF INVENTION

It is therefore an object of the present disclosure to provide a moving body which may have a dimension of its housing reduced in a direction perpendicular to the traveling surface.

A moving body according to an aspect of the present disclosure includes a housing, a traction motor, and a battery. The traction motor allows the housing to travel along a traveling surface. The battery supplies electric power to the driving motor. The traction motor and the battery are arranged at different positions when viewed perpendicularly to the traveling surface.

DESCRIPTION OF EMBODIMENTS

(1) Embodiments (1.1) Overview

Figure 2:
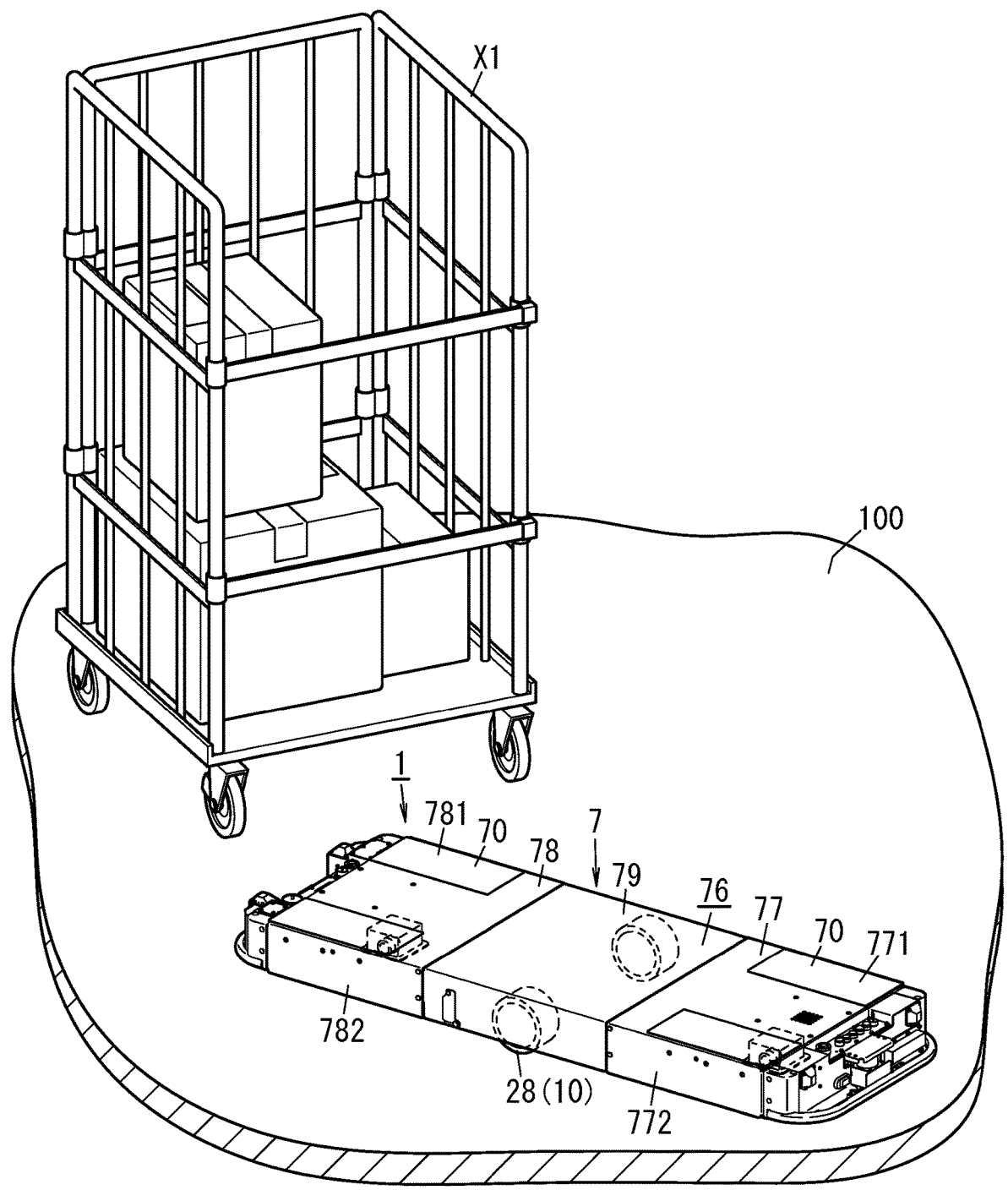
FIG. 2 is a perspective view of the moving body and a burden.
Figure 17:
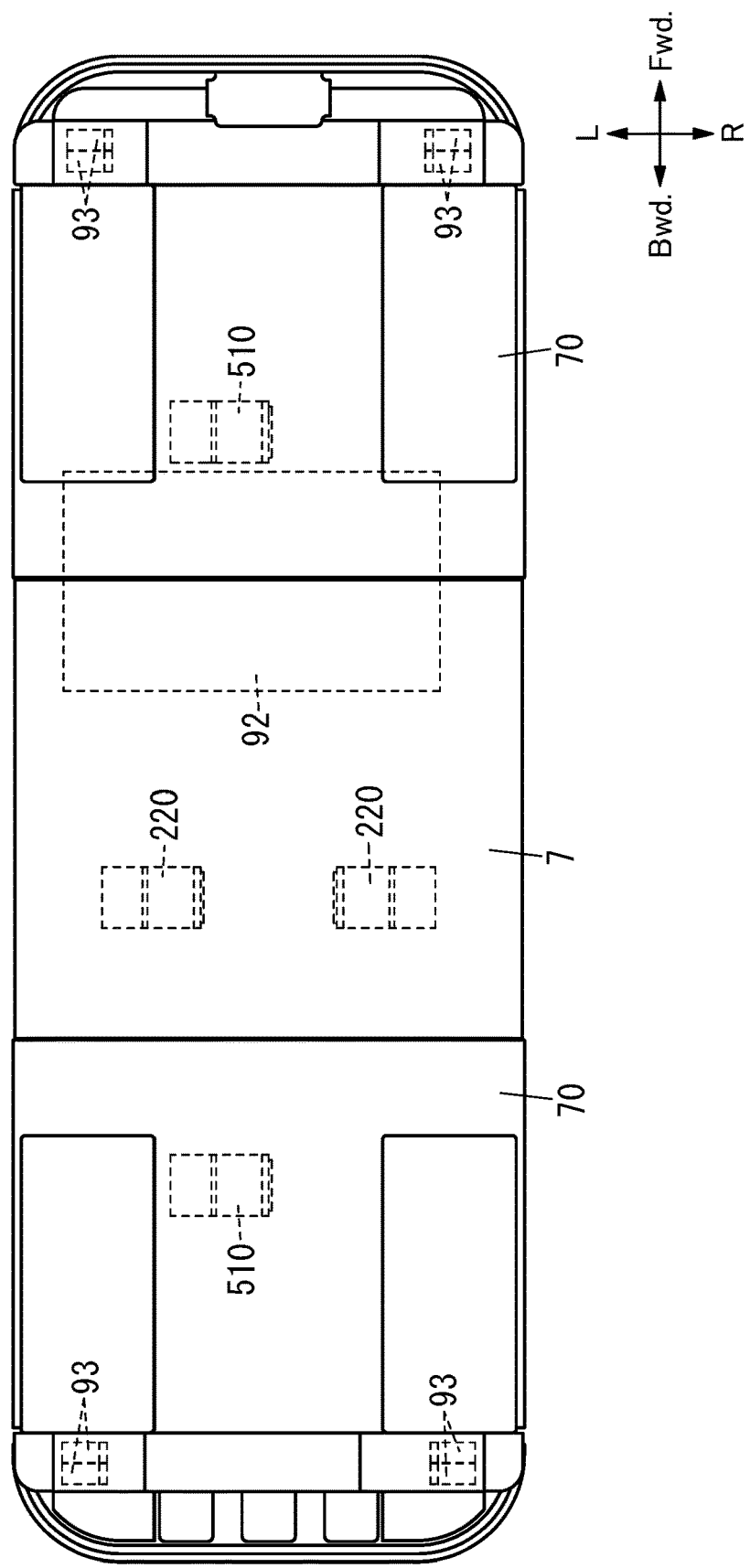
FIG. 17 is a plan view of the moving body.

A moving body 1A according to this embodiment travels along a traveling surface 100 (see FIG. 2). As shown in FIG. 17, the moving body 1A includes a traction motor 220, a battery 92, and a housing 7.

As used herein, the "traveling surface 100" is a surface on which the moving body 1A is designed to travel. Examples of the traveling surface 100 include a floor surface, the upper surface of a mat, the ground, the upper surface of an asphalt road, and the upper surface of a concrete road. The traveling surface 100 may be located in an indoor place or an outdoor place, whichever is appropriate. Examples of the places include warehouses, factories, construction sites, stores (including shopping malls), distribution centers, offices, parks, dwelling houses, schools, hospitals, railway stations, airports, parking lots, and the inside of public transportation. Examples of the public transportation include ships, railway trains, and aircrafts. The traveling surface 100 does not have to be a horizontal plane and may have some unevenness as well.

The traction motor 220 propels the housing 7 along the traveling surface 100. The number of the traction motors 220 provided may be plural or single, whichever is appropriate. The traction motor 220 may be a motor for driving wheels that support the housing 7 on the traveling surface 100, a motor for driving a pinion of a rack and pinion mechanism, or a motor for reeling in a wire used for traction of the moving body 1A, for example. The traction motor 220 may be used as a drive source 22 for driving these.

The battery 92 supplies electric power to the traction motor 220 and an elevator motor 510. When viewed perpendicularly to the traveling surface 100, the traction motor 220 and the battery 92 are arranged at mutually different positions. As used herein, when two elements are "arranged at mutually different positions," it means that those elements do not overlap with each other when viewed perpendicularly to the traveling surface 100, no matter how distant or close those elements are located from/to each other. Therefore, two elements arranged in contact with each other and adjacent to each other but not overlapping with each other when viewed perpendicularly to the traveling surface 100 may also be herein regarded as being "arranged at mutually different positions."

Thus, in the moving body 1A according to this embodiment, the traction motor 220 and the battery 92 do not overlap with each other when viewed perpendicularly to the track surface (i.e., traveling surface 100), thus allowing the dimension of the housing 7 as measured perpendicularly to the track surface (traveling surface 100) to be reduced as much as possible.

(1.2) Details (1.2.1) Overall Configuration

A moving body 1A according to this embodiment will now be described in detail. In the following description, the traveling surface 100 is supposed to be a horizontal plane unless otherwise stated. However, this is only an example of the present disclosure and should not be construed as limiting. The traveling surface 100 does not have to be a horizontal plane. Also, in the following description, two mutually opposite directions perpendicular to the traveling surface 100 will be hereinafter referred to as "upward/downward directions," a direction in which the moving body 1A travels forward will be hereinafter referred to as a "forward direction," the opposite direction thereof will be hereinafter referred to as a "backward direction," and the forward and backward directions will be hereinafter referred to as "forward/backward directions." Furthermore, two mutually opposite directions perpendicular to both the upward/downward directions and the forward/backward directions are herein defined to be "rightward/leftward directions." Note that these definitions of the directions should not be construed as limiting the use of the moving body 1A. In addition, it should also be noted that the arrows indicating these directions on the drawings are just shown there for convenience sake and are insubstantial ones.

The moving body 1A is a device designed to travel along the traveling surface 100. In the following description, a moving body 1A traveling on a plurality of wheels 10 along the traveling surface 100 will be described as an exemplary embodiment. However, this is only an example of the present disclosure and should not be construed as limiting. As will be described later in the "(2) Variations" section, the moving body 1A does not have to travel on the plurality of wheels 10.

Figure 1:
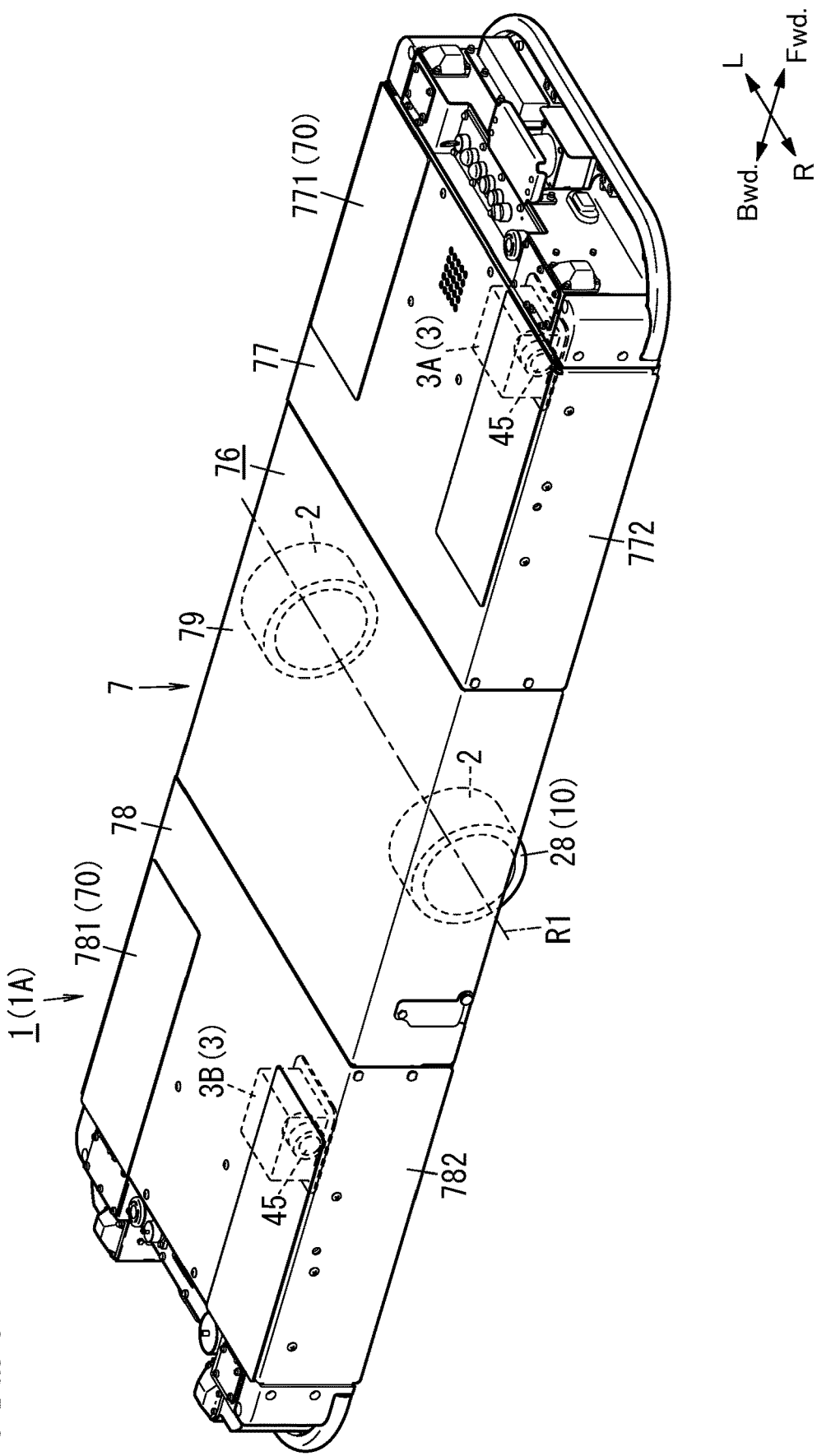
FIG. 1 is a perspective view of a moving body according to an exemplary embodiment.

As shown in FIGS. 1 and 2, the moving body 1A is designed to travel along the traveling surface 100 by turning its wheels 10 on the traveling surface 100 (e.g., on the ground) about their rotary axis R1 which is parallel to the traveling surface 100. In this embodiment, the moving body 1A is designed to travel to its destination while being loaded with a burden X1. In other words, the moving body 1A according to this embodiment serves as a carrier 1 for carrying the burden X1. In the following description, a carrier 1 will be described in detail as an example of the moving body 1A.

In this embodiment, the carrier 1 performs the job of receiving a control signal in a predetermined area to carry the burden X1 in accordance with an instruction given as the control signal. Examples of the predetermined area A1 include warehouses, factories, construction sites, stores (including shopping malls), distribution centers, offices, parks, dwelling houses, schools, hospitals, railway stations, airports, and parking lots. Furthermore, the "predetermined area" may also be the inside of some public transportation such as a ship, a railway train, or an aircraft. In the following description of embodiments, the predetermined area is supposed to be a distribution warehouse, for example.

The burden X1 is something to be carried. Examples of the burden X1 include a load, final products completed in factories, work in progress (intermediate products), and a pallet with a load. In this embodiment, the burden X1 may be a roll box pallet loaded with packages as shown in FIG. 2. In the following description, the burden X1 will be hereinafter sometimes referred to as a "load placed."

The carrier 1 according to this embodiment includes elevator units 70 on which the burden X1 is to be loaded. The elevator units 70 are designed to be elevated and lowered with respect to the traveling surface 100. The carrier 1 moves to slip into the gap under the burden Xl, elevate its elevator units 70, and then load the burden X1 thereon. In this state, the carrier 1 travels to its destination and lowers its elevator units 70. In this manner, the carrier 1 according to this embodiment carries the burden X1. The elevator units 70 will be described in detail later in the "(1.2.4) Elevator mechanism" section.

Figure 6:
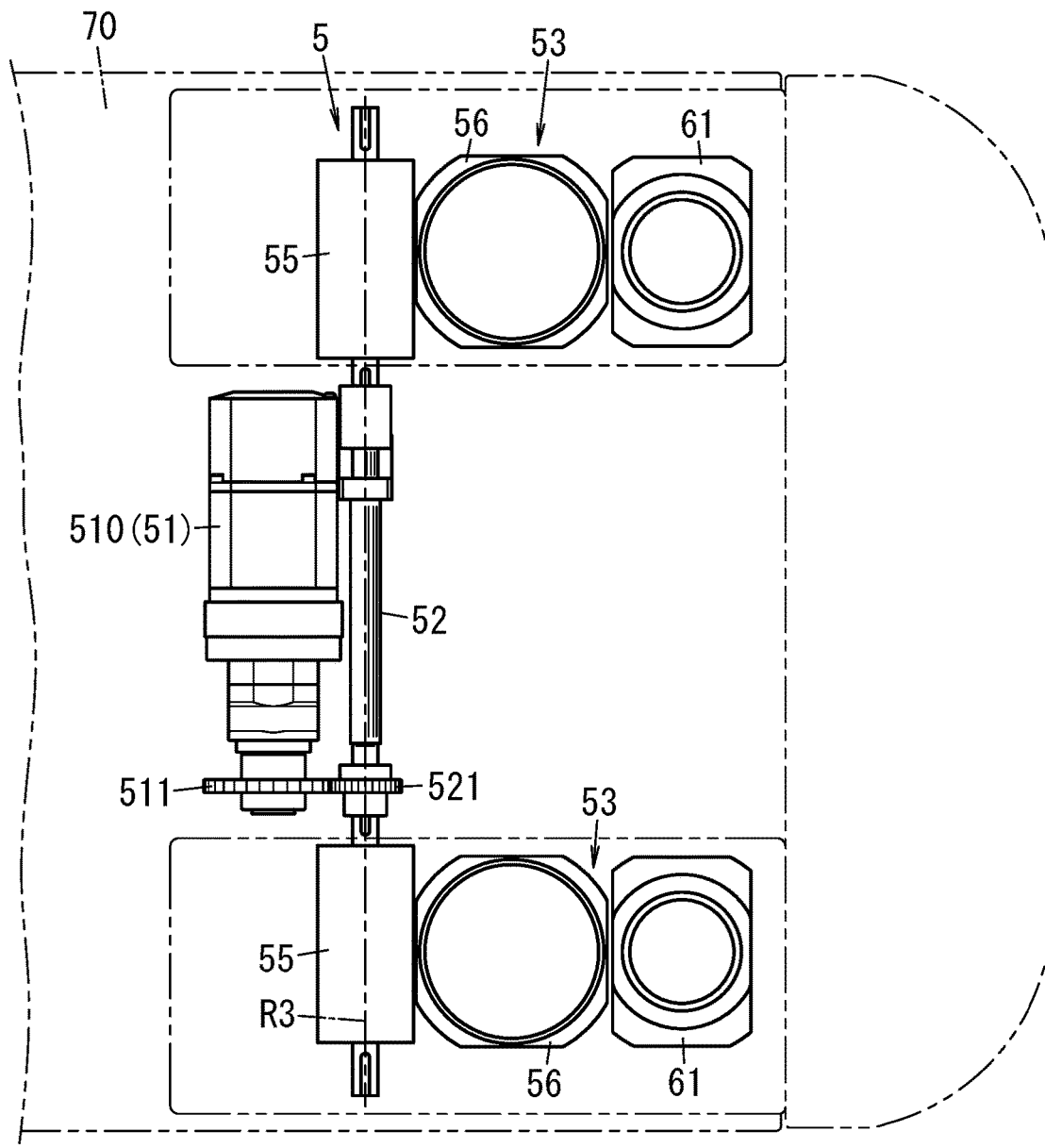
FIG. 6 is a schematic plan view of an elevator mechanism for the moving body.

As shown in FIG. 1, the carrier 1 includes a housing 7 with the elevator units 70, a control unit 9 (see FIG. 13), a plurality of (e.g., two in this example) driving wheel units 2, a plurality of (e.g., two in this example) auxiliary wheel units 3, and a plurality of (e.g., two in this example) elevator mechanisms 5 (see FIG. 6). The carrier 1 further includes a detection unit 91 (see FIG. 13) and the battery 92 (see FIG. 17).

(1.2.2) Driving Wheel Unit

Figure 3:
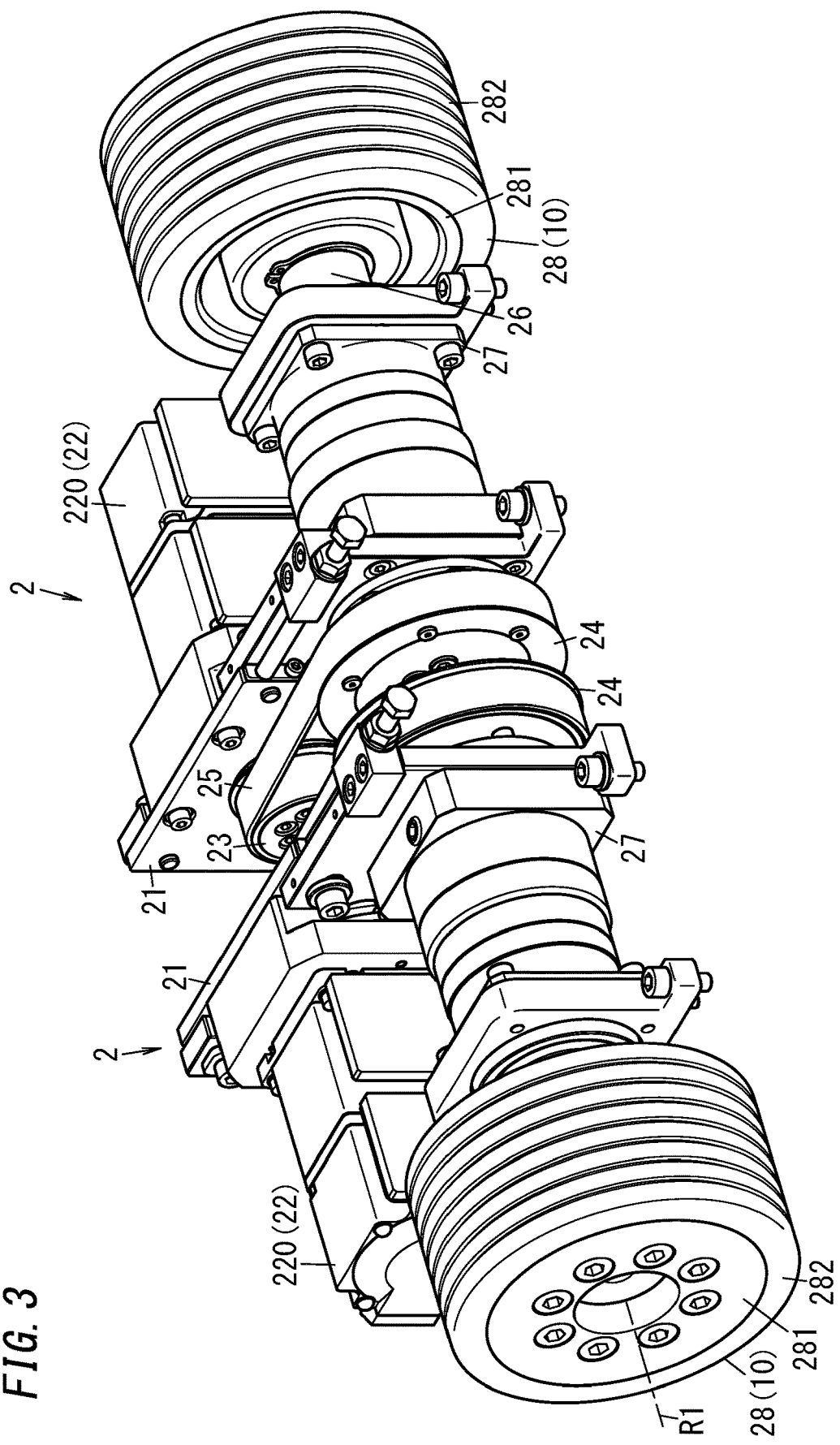
FIG. 3 is a perspective view of a driving wheel unit for the moving body.

The driving wheel units 2 propel the carrier 1 along the traveling surface 100. In this embodiment, the driving wheel units 2 are arranged in a middle portion in the forward/backward directions as shown in FIG. 1. As used herein, the "middle portion" refers to a portion, of which the length accounts for one-third of the overall length of the carrier 1 as measured in the forward/backward directions and which has a range covering one of three areas, each having an equal length as measured in the forward/backward directions, and defined to extend from the middle in the forward/backward directions of the carrier 1. However, the driving wheel units 2 do not have to be arranged in this range but may also be arranged in any other range without limitation. As shown in FIG. 3, the two driving wheel units 2 are arranged in the middle portion in the forward/backward directions of the carrier 1 so as to be symmetric to each other in the rightward/leftward directions.

Each driving wheel unit 2 includes a base 21, a drive source 22, a drive pulley 23 and a driven pulley 24, a power transmission 25, a shaft 26, a bearing unit 27, and a wheel 10. The motive power generated by the drive source 22 is transmitted through the drive pulley 23, the power transmission 25, the driven pulley 24, the shaft 26, and the wheel 10 in this order. The wheel 10 supports the housing 7 on the traveling surface 100. The wheel 10 as used herein will be hereinafter sometimes referred to as a "driving wheel 28." As used herein, the "driving wheel 28" refers to a wheel 10 that turns on receiving motive power from the drive source 22 either directly or indirectly. In this embodiment, the two driving wheel units 2 have the same structure, and therefore, each pair of constituent elements of theirs having the same function will be designated by the same reference sign and description thereof will be omitted herein as appropriate.

The base 21 is fixed to the housing 7. In this embodiment, the base 21 is configured as a rectangular plate member, of which the width is defined by the upward/downward directions and the length is defined by the forward/backward directions. On the base 21, mounted are respective parts of the drive source 22, the drive pulley 23, the driven pulley 24, and the bearing unit 27.

The drive source 22 is a source of generating motive power and drives the driving wheel 28. In this embodiment, the drive source 22 serves as the traction motor 220. The traction motor 220 according to this embodiment is implemented as an electric motor. However, this is only an example of the present disclosure and should not be construed as limiting. Alternatively, the drive source 22 may also be implemented as a hydraulic motor, an air motor, or any other suitable type of motor. The output shaft (not shown) of the traction motor 220 extends in the rightward/leftward directions. In particular, the tip of the output shaft points toward a middle in the rightward/leftward directions. The tip of the output shaft of the traction motor 220 is connected to the drive pulley 23.

The drive pulley 23 and the driven pulley 24 are mounted onto the base 21 so as to be rotatable around respective axes that are parallel to the rightward/leftward directions. The drive pulley 23 and the driven pulley 24 are arranged to be spaced from each other in the forward/backward directions. The drive pulley 23 is powered by the traction motor 220 to rotate around its rotary axis, which is defined by the output shaft of the traction motor 220. The drive pulley 23 and the driven pulley 24 are coupled together via the power transmission 25 so as to transmit motive power to each other.

The power transmission 25 transmits motive power from the drive pulley 23 to the driven pulley 24. In this embodiment, the power transmission 25 is implemented as an endless belt. Alternatively, the power transmission 25 may also be implemented as a chain, a wire, a rope, a shaft, or a gear, for example.

The driven pulley 24 is a pulley to which the motive power is transmitted from the drive pulley 23 via the power transmission 25. In this embodiment, the outside diameter of the driven pulley 24 is larger than that of the drive pulley 23. However, this is only an example of the present disclosure and should not be construed as limiting. Alternatively, the outside diameter of the driven pulley 24 may also be equal to or less than that of the drive pulley 23. The driven pulley 24 is coupled to the shaft 26 so that the driven pulley 24 and the shaft 26 are concentric with each other.

The shaft 26 couples the driving wheel 28 to the driven pulley 24. The shaft 26 is supported by the bearing unit 27 so as to be rotatable around a rotary axis R1 extending the rightward/leftward directions. In other words, the shaft 26 causes the driving wheel 28 to turn around the rotary axis R1.

The driving wheel 28 turns with the motive power transmitted from the drive source 22. The driving wheel 28 is coupled to a longitudinal end of the shaft 26. In this embodiment, the driving wheel 28 includes a wheel 281 coupled to the shaft 26 and a tire 282.

In this embodiment, the tire 282 is configured as a resin member lined around the wheel 281. Alternatively, the tire 282 may also be implemented as a rubber tire, which may be solid one or a hollow one, whichever is appropriate. Still alternatively, the driving wheel 28 may include no wheel 281 but may be a wheel which is made entirely of a resin or any other suitable material. Optionally, the driving wheel 28 may include a crawler.

In the driving wheel unit 2 according to this embodiment, the motive power generated by the traction motor 220 is transmitted through the drive pulley 23, the power transmission 25, the driven pulley 24, and the shaft 26 in this order, thereby driving the driving wheel 28. In other words, the driving wheel 28 receives the motive power indirectly from the traction motor 220. However, this is only an example of the present disclosure and should not be construed as limiting. Alternatively, driving force may be directly transmitted to the driving wheel 28 by directly connecting the driving wheel 28 to the output shaft of the traction motor 220 or using an in-wheel motor, for example.

In this embodiment, the traction motor 220 of each driving wheel unit 2 may change the rotational direction of the output shaft as appropriate from a forward rotational direction to a backward rotational direction, or vice versa. As used herein, the "forward rotational direction" refers to the rotational direction of the output shaft when the carrier 1 travels in the forward direction and the "backward rotational direction" refers to the rotational direction of the output shaft when the carrier 1 travels in the backward direction.

In this embodiment, in the two driving wheel units 2, the traction motor 220 of one driving wheel unit 2 runs independently of the traction motor 220 of the other driving wheel unit 2. In other words, these two driving wheel units 2 are independent of each other. This allows the carrier 1 according to this embodiment to turn to the right or to the left by causing the two driving wheels 28 to rotate at mutually different angular velocities and to travel straight by causing the two driving wheels 28 to rotate at the same angular velocity. Thus, the carrier 1 according to this embodiment may travel forward and backward and turn to the right and to the left (e.g., may make a pivot turn and a spin turn).

In this embodiment, the carrier 1 travels at a lower velocity when going backward than when going forward. However, this is only an example of the present disclosure and should not be construed as limiting. Alternatively, the carrier 1 may travel at the same velocity when going backward as when going forward.

The two driving wheel units 2 are arranged in a portion located in the middle of the forward/backward directions of the housing 7 so as to be spaced apart from each other in the rightward/leftward directions. In particular, in this embodiment, the two driving wheel units 2 are arranged to be symmetric to each other in the rightward/leftward direction as described above, and the respective outer end faces in the rightward/leftward directions of the driving wheels 28 are located inside the respective outer end faces in the rightward/leftward directions of the housing 7. That is to say, the two driving wheels 28 are housed in the housing 7 in a plan view.

In this embodiment, the two auxiliary wheel units 3 are arranged to be spaced apart from each other in the forward/backward directions as shown in FIG. 1. The driving wheel units 2 are arranged between the two auxiliary wheel units 3. As will be described later in the "(1.2.3) Auxiliary wheel unit" section, each auxiliary wheel unit 3 includes at least one auxiliary wheel 45. In other words, the at least one driving wheel 28 is arranged between the plurality of auxiliary wheels 45.

In this embodiment, the two driving wheel units 2 are arranged to be aligned with each other in the forward/ backward directions. However, this is only an example of the present disclosure and should not be construed as limiting. Alternatively, the two driving wheel units 2 may also be misaligned with each other in the forward/backward directions. Optionally, the carrier 1 may include only one driving wheel unit 2. In that case, the driving wheel 28 may be formed to have a width corresponding to the entire width in the rightward/leftward directions of the housing 7 or may be arranged in the middle in the rightward/leftward directions. Even in any of these alternative configurations, at least one driving wheel unit 2 is suitably arranged between the two auxiliary wheel units 3.

(1.2.3) Auxiliary Wheel Unit

The auxiliary wheel unit 3 is a unit including a wheel 10 (see FIG. 4) that aids the moving body 1A in traveling on the driving wheels 28. In this embodiment, one of the plurality of auxiliary wheel units 3 is arranged forward of the plurality of driving wheel units 2 and another one of the plurality of auxiliary wheel units 3 is arranged backward of the plurality of driving wheel units 2 as shown in FIG. 1. In the following description, the auxiliary wheel unit 3 arranged forward of the plurality of driving wheel units 2 will be hereinafter referred to as a "first auxiliary wheel unit 3A" and the auxiliary wheel unit 3 arranged backward of the plurality of driving wheel units 2 will be hereinafter referred to as a "second auxiliary wheel unit 3B."

Figure 4:
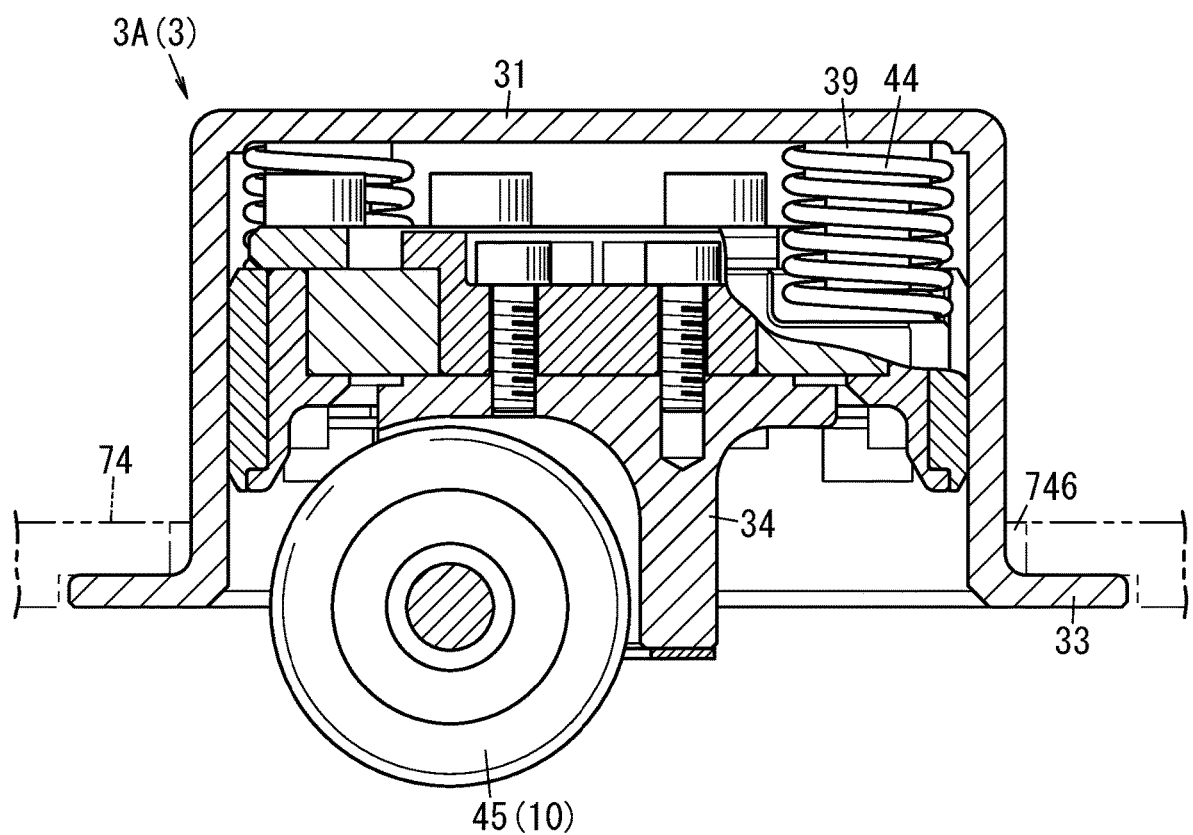
FIG. 4 is a cross-sectional view of an auxiliary wheel unit for the moving body.

In this embodiment, the first auxiliary wheel unit 3A is arranged in a front portion of the bottom plate 74 of the housing 7 so as to be located in the middle in the rightward/leftward directions. As used herein, the "front portion" refers to a portion, having a range located forward of the middle portion in the forward/backward directions, of the housing 7. FIG. 4 is a cross-sectional view of the first auxiliary wheel unit 3A taken along a vertical plane. The auxiliary wheel unit 3A includes a case 31, an auxiliary wheel supporting member 34, a shock absorber mechanism 39, and a wheel 10.

Figure 5:
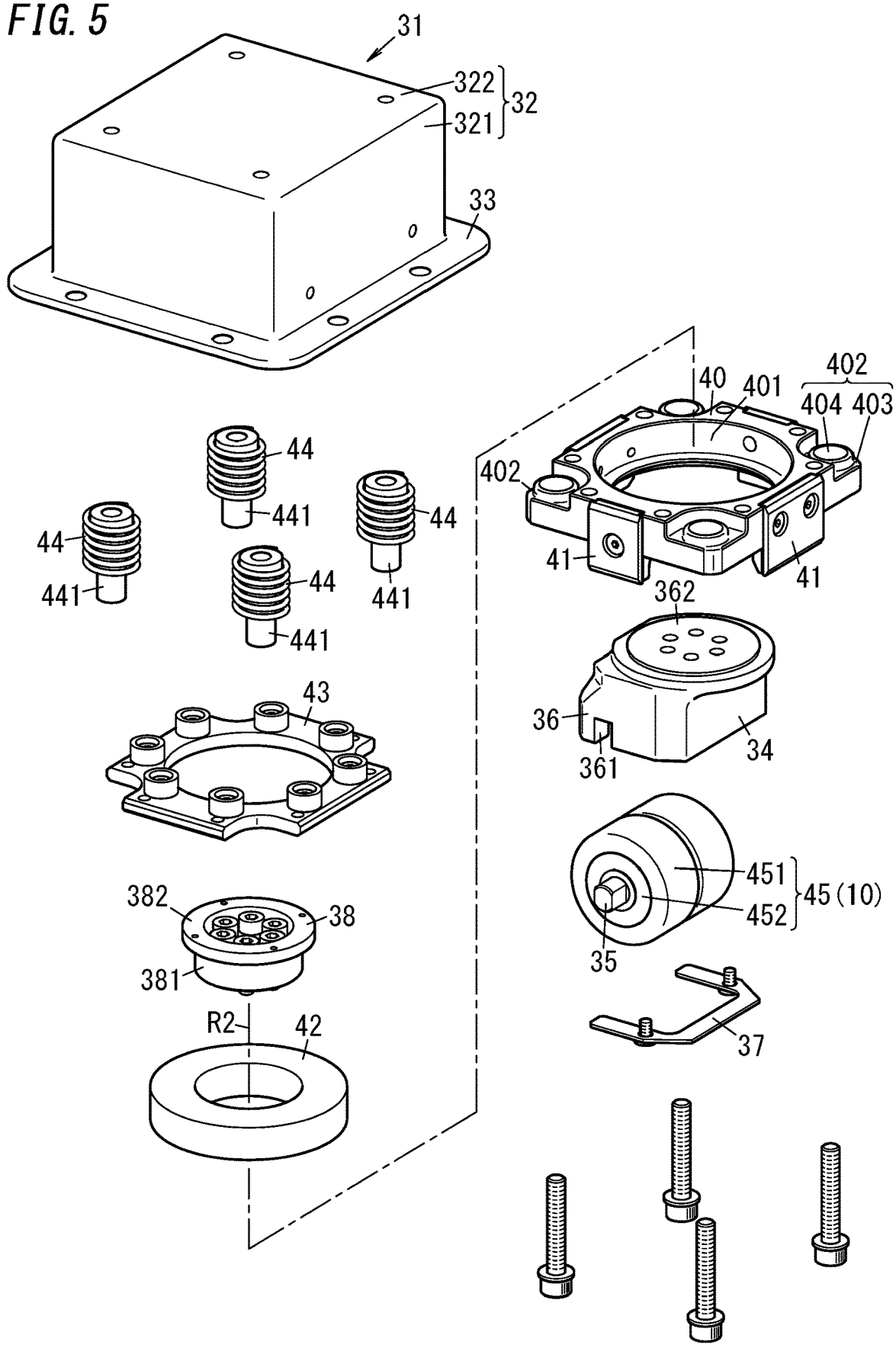
FIG. 5 is an exploded perspective view of the auxiliary wheel unit.

The case 31 is a portion, designed to be secured to the housing 7, of the first auxiliary wheel unit 3A. As shown in FIG. 5, the case 31 includes a case body 32 and a flange piece 33. The case body 32 includes a plurality of side plates 321 and a top plate 322 and is formed in the shape of a rectangular parallelepiped, of which the lower surface is open. The flange piece 33 is provided to surround the outer peripheral edges of the opening of the case body 32. In this embodiment, the bottom plate 74 of the housing 7 has an opening 746 through which the first auxiliary wheel unit 3A is mounted as shown in FIG. 4. When the first auxiliary wheel unit 3A is mounted onto the bottom plate 74, the case body 32 is passed through the opening 746 to be housed in the housing 7 and the flange piece 33 is put on the lower surface of the bottom plate 74 of the housing 7. The flange piece 33 is screwed onto the bottom plate 74.

The wheel 10 supports the housing 7 on the traveling surface 100. In the following description, the wheel 10 will be hereinafter sometimes referred to as an "auxiliary wheel 45." As used herein, the "auxiliary wheel 45" refers to the wheel 10 that receives no motive power from the drive source 22 and that turns as the housing 7 is propelled by the plurality of driving wheels 28. As shown in FIG. 5, the auxiliary wheel 45 includes a plurality of rollers 451 and a plurality of bearings 452.

Each of the rollers 451 is formed in the shape of a cylinder, of which the center shaft serves as a rotary axis. Each roller 451 may be made of a resin, for example. Alternatively, the roller 451 may also be made of rubber, elastomer, urethane, nylon, phenol, polycarbonate, or any other suitable material. Also, the roller 451 suitably has a color similar to that of the traveling surface 100. The plurality of rollers 451 are adjacent to each other along the rotary axis.

The plurality of bearings 452 are fitted into the respective center holes of the plurality of rollers 451 so as to be concentric with the rollers 451. The bearings 452 are arranged between a mount shaft 35 forming part of the auxiliary wheel supporting member 34 and the plurality of rollers 451. Each of the bearings 452 may be configured as a ball bearing or a roller bearing, for example.

The auxiliary wheel supporting member 34 supports the auxiliary wheel 45 to allow the auxiliary wheel 45 to turn around a shaft parallel to the traveling surface 100. Furthermore, the auxiliary wheel supporting member 34 is supported to be rotatable around an axis extending in the upward/downward directions with respect to a movable frame 40 included in the shock absorber mechanism 39. The auxiliary wheel supporting member 34 includes the mount shaft 35, a supporting member body 36, a retention portion 37, and a stopper 38.

The mount shaft 35 supports the auxiliary wheel 45 thereon to allow the auxiliary wheel 45 to turn around its rotary axis. The mount shaft 35 extends in one direction along the traveling surface 100. Specifically, the mount shaft 35 is inserted into the inner center hole of the bearing 452. The mount shaft 35 is supported by the supporting member body 36.

The supporting member body 36 is a member to which the mount shaft 35 is attached. In this embodiment, the supporting member body 36 includes a pair of grooves 361 and an upper contact surface 362. Each groove 361 is open downward to allow an associated end portion of the mount shaft 35 to be fitted thereto through the opening. In this embodiment, the retention portion 37 is attached to the supporting member body 36 with the associated end portions of the mount shaft 35 fitted into the pair of grooves 361. The retention portion 37 regulates the downward movement of the mount shaft 35, of which the associated end portions are fitted into the pair of grooves 361.

The upper contact surface 362 is a surface which faces upward and which comes into contact with the lower surface of a bearing member 42 of the shock absorber mechanism 39. When upward force is applied from the auxiliary wheel 45 thereto, the supporting member body 36 transmits the force to the bearing member 42 via the upper contact surface 362.

The stopper 38 is supported by the bearing member 42, which forms part of the shock absorber mechanism 39, so as to be rotatable around a rotary axis R2 aligned with the upward/downward directions. The stopper 38 is also fixed onto the supporting member body 36. Since the bearing member 42 is attached to the movable frame 40 included in the shock absorber mechanism 39 as will be described later, the stopper 38 is supported so as to be rotatable around the rotary axis R2 with respect to the movable frame 40.

The stopper 38 includes a shaft portion 381 to be inserted into the center hole of the bearing member 42 and a flange portion 382 protruding radially from an upper end portion of the shaft portion 381. The flange portion 382 is put on the upper surface of the bearing member 42. The supporting member body 36 is attached to the lower end of the shaft portion 381.

The shock absorber mechanism 39 is a mechanism for absorbing the shock provided by the auxiliary wheel 45. In the carrier 1 according to this embodiment, the auxiliary wheel unit 3 includes the shock absorber mechanism 39 while the driving wheel unit 2 does not include the shock absorber mechanism 39. In other words, the carrier 1 according to this embodiment is provided with no shock absorber mechanisms 39 for absorbing the shock provided by the driving wheels 28. Thus, providing the shock absorber mechanism 39 for the auxiliary wheel unit 3 while simplifying, as much as possible, the structure of the driving wheel unit 2 that tends to have a complicated mechanism allows the carrier 1 to travel smoothly while reducing its dimension as measured in the upward/downward directions.

The shock absorber mechanism 39 includes the movable frame 40, a plurality of slidable members 41, the bearing member 42, a presser plate 43, and a plurality of buffer springs 44.

The movable frame 40 is attached to the case 31 so as to be movable in the upward/downward directions with respect to the case 31. The movable frame 40 may be just fitted into the case 31 or screwed onto the case 31 so that the movable frame 40 is movable with respect to the case 31. The movable frame 40 has a through hole 401 and includes a plurality of spring mounting portions 402. The through hole 401 is provided to receive the bearing member 42 therein and to pass the shaft portion 381 of the stopper 38 therethrough. The through hole 401 has a circular shape when viewed from over the movable frame 40 (hereinafter referred to as "when viewed in plan") and forms a center hole of the movable frame 40. The plurality of spring mounting portions 402 allows a plurality of buffer springs 44 to be mounted thereto. In this embodiment, each spring mounting portion 402 includes a spring contact surface 403 to come into contact with the lower end of an associated buffer spring 44 and a passage hole 404 to pass a fixing pin 441 therethrough. The passage hole 404 may or may not penetrate through the movable frame 40 in the upward/downward directions.

The slidable members 41 are arranged between the outer side surfaces of the movable frame 40 and the inner side surfaces of the case 31 to reduce the friction to be caused when the movable frame 40 moves in the upward/downward directions. In this embodiment, each of the slidable members 41 is formed in a plate shape. The principal surface of each slidable member 41 is a vertical plane which faces an associated inner side surface of the case 31. In this embodiment, the slidable members 41 are attached to the movable frame 40. The slidable members 41 have a smaller coefficient of friction than the movable frame 40. The slidable members 41 may be made of fluororesin, nylon, tetrafluoroethylene resin, or any other suitable material. However, this is only an example of the present disclosure and should not be construed as limiting. Alternatively, the slidable members 41 may be attached to the entire inner side surfaces of the case 31 and the side plates 321 of the case 31 may be made of a material, of which the coefficient of friction is equal to or less than that of the slidable members 41.

The bearing member 42 supports the stopper 38 to allow the stopper 38 to rotate around the rotary axis R2. That is to say, the bearing member 42 supports the auxiliary wheel supporting member 34. The bearing member 42 is fitted into the through hole 401 of the movable frame 40 and thereby attached to the movable frame 40. The bearing member 42 may be configured as a rolling bearing (such as a ball bearing or a roller bearing), a sliding bearing, or a hydrodynamic bearing, for example.

The presser plate 43 regulates the upward movement of the bearing member 42. The presser plate 43 is fixed onto the movable frame 40 over the bearing member 42 fitted into the through hole 401 of the movable frame 40. This allows even the upward force transmitted from the auxiliary wheel 45 and applied to the bearing member 42 via the auxiliary wheel supporting member 34 to be received at the presser plate 43. Receiving the force at the presser plate 43 causes the movable frame 40 to move upward with respect to the case 31.

The plurality of buffer springs 44 are arranged between the upper surface of the movable frame 40 and the lower surface of the top plate 322 of the case 31. The respective buffer springs 44 are elastically deformable in the upward/downward directions. This allows, as the movable frame 40 moves upward with respect to the case 31, the plurality of buffers spring 44 to be deformed elastically in the upward/downward directions and thereby absorb the shock.

In this embodiment, each of the buffer springs 44 is a coil spring with a center axis parallel to the upward/downward directions. However, the buffer spring 44 does not have to be a coil spring but just need to have a spring property. Alternatively, the buffer spring 44 may also be a leaf spring (including a thin leaf spring), a disc spring, a rubber spring, an air spring, anti-vibration rubber or cushion rubber, for example.

In this embodiment, the plurality of buffer springs 44 are mounted onto the spring mounting portions 402 provided at the four corners of the movable frame 40. This allows, when the movable frame 40 moves upward with respect to the case 31, the plurality of buffer springs 44 to be deflected generally uniformly, thus enabling the movable frame 40 to be translated in the upward/downward directions.

In this embodiment, the plurality of buffer springs 44 all have the same total deflection. As used herein, the "total deflection" refers to the deflection of each buffer spring 44 obtained by subtracting the height of the buffer spring 44 compressed to a maximum degree under a load (i.e., its solid height) from the height of the buffer spring 44 under no load (i.e., its free height). In this embodiment, each buffer spring 44 of the first auxiliary wheel unit 3A has a total deflection of about 3 mm.

As shown in FIG. 1, the second auxiliary wheel unit 3B is arranged in a rear portion of the bottom plate 74 of the housing 7 so as to be located in the middle in the rightward/leftward directions. As used herein, the "rear portion" refers to a portion, having a range located backward of the middle portion in the forward/backward directions, of the housing 7. The second auxiliary wheel unit 3B has the same structure as the first auxiliary wheel unit 3A.

Nevertheless, the buffer springs 44 of the second auxiliary wheel unit 3B have a different total deflection from the buffer springs 44 of the first auxiliary wheel unit 3A. In this embodiment, the buffer springs 44 of the second auxiliary wheel unit 3B have a total deflection of about 8 mm. Since the buffer springs 44 of the first auxiliary wheel unit 3A have a total deflection of about 3 mm as described above, the buffer springs 44 of the second auxiliary wheel unit 3B have a larger total deflection than the buffer springs 44 of the first auxiliary wheel unit 3A. This reduces the degree of maximum downward displacement of a portion, corresponding to the first auxiliary wheel unit 3A, of the housing 7 (i.e., the front portion of the housing 7 in this embodiment). This also reduces, when the burden X1 is loaded at a position corresponding to the first auxiliary wheel unit 3A, the degree of downward tilt of the front portion of the carrier 1. This prevents, when a laser sensor, for example, is provided in the front portion of the carrier 1, the front portion of the carrier 1 from being downwardly tilted so much as to cause the sensor to detect the track surface (i.e., traveling surface 100) erroneously.

(1.2.4) Elevator Mechanism
(1.2.4.1) Overall Configuration

The carrier 1 according to this embodiment includes a plurality of elevator units 70, which may be elevated and lowered with respect to the traveling surface 100 independently of each other, as shown in FIG. 1. The elevator units 70 are parts to load the burden X1 (load placed) thereon and form parts of the housing 7 in this embodiment. As shown in FIG. 2, the carrier 1 according to this embodiment moves to slip into the gap under the roll box pallet with a load (burden X1), elevates at least one of its elevator units 70 to lift the burden X1, and then travels with the burden X1 lifted. However, this procedure, including slipping the carrier 1 to under the burden X1, elevating the elevator unit(s) 70, and loading the burden X1, is only an exemplary operation of the carrier 1. Alternatively, a worker may manually load the burden X1 onto the elevator units 70 which are not elevated so that the carrier 1 travels in such a state.

In this embodiment, the carrier 1 includes a plurality of elevator mechanisms 5 (see FIG. 6) for elevating the plurality of elevator units 70.

Each elevator mechanism 5 is a mechanism for elevating and lowering an associated elevator unit 70 to load the burden X1 thereon. The carrier 1 according to this embodiment includes a plurality of (e.g., two in this example) elevator mechanisms 5. The plurality of elevator mechanisms 5 are provided one to one for the plurality of elevator units 70. One elevator mechanism 5 out of the plurality of elevator mechanisms 5 is arranged in the front portion of the housing 7, while the other elevator mechanism 5 is arranged in the rear portion of the housing 7. The elevator mechanism 5 arranged in the front portion has the same mechanism as the elevator mechanism 5 arranged in the rear portion. Thus, the following description will be focused on the elevator mechanism 5 arranged in the front portion.

FIG. 6 schematically illustrates the elevator mechanism 5 arranged in the front portion. Each elevator mechanism 5 includes a drive source 51, a drive shaft 52, a plurality of (e.g., two in this example) supporting units 53, and a loading sensor 95 (see FIG. 13).

(1.2.4.2) Drive Source

The drive source 51 is a source of generating motive power and drives the supporting units 53. As the elevator unit 70 is actuated in synch with the operation of the supporting units 53, the drive source 51 drives the elevator unit 70. In this embodiment, the drive source 51 serves as the elevator motor 510. The elevator motor 510 according to this embodiment is implemented as an electric motor. However, this is only an example of the present disclosure and should not be construed as limiting. Alternatively, the drive source 51 may also be implemented as a hydraulic motor, an air motor, or any other suitable type of motor. The motive power output from the output shaft of the elevator motor 510 is transmitted to the drive shaft 52, thus turning the drive shaft 52 around a rotary axis R3. In this embodiment, a drive gear 511 is fixed on the output shaft of the elevator motor 510.

(1.2.4.3) Drive Shaft

The drive shaft 52 causes the motive power transmitted from the elevator motor 510 to be distributed in two separate regions so that the distributed components of the motive power are transmitted to the plurality of supporting units 53, respectively. A driven gear 521 meshing with the drive gear 511 is fixed to a portion of the drive shaft 52. As the elevator motor 510 runs, its motive power is transmitted to the drive shaft 52 via the drive gear 511 and the driven gear 521, thus causing the drive shaft 52 to start turning around the rotary axis R3. Both ends of the drive shaft 52 are coupled to the supporting units 53. This allows the motive power output from the elevator motor 510 to be transmitted to the plurality of supporting units 53 provided separately from each other.

(1.2.4.4) Supporting Unit

Figure 7:
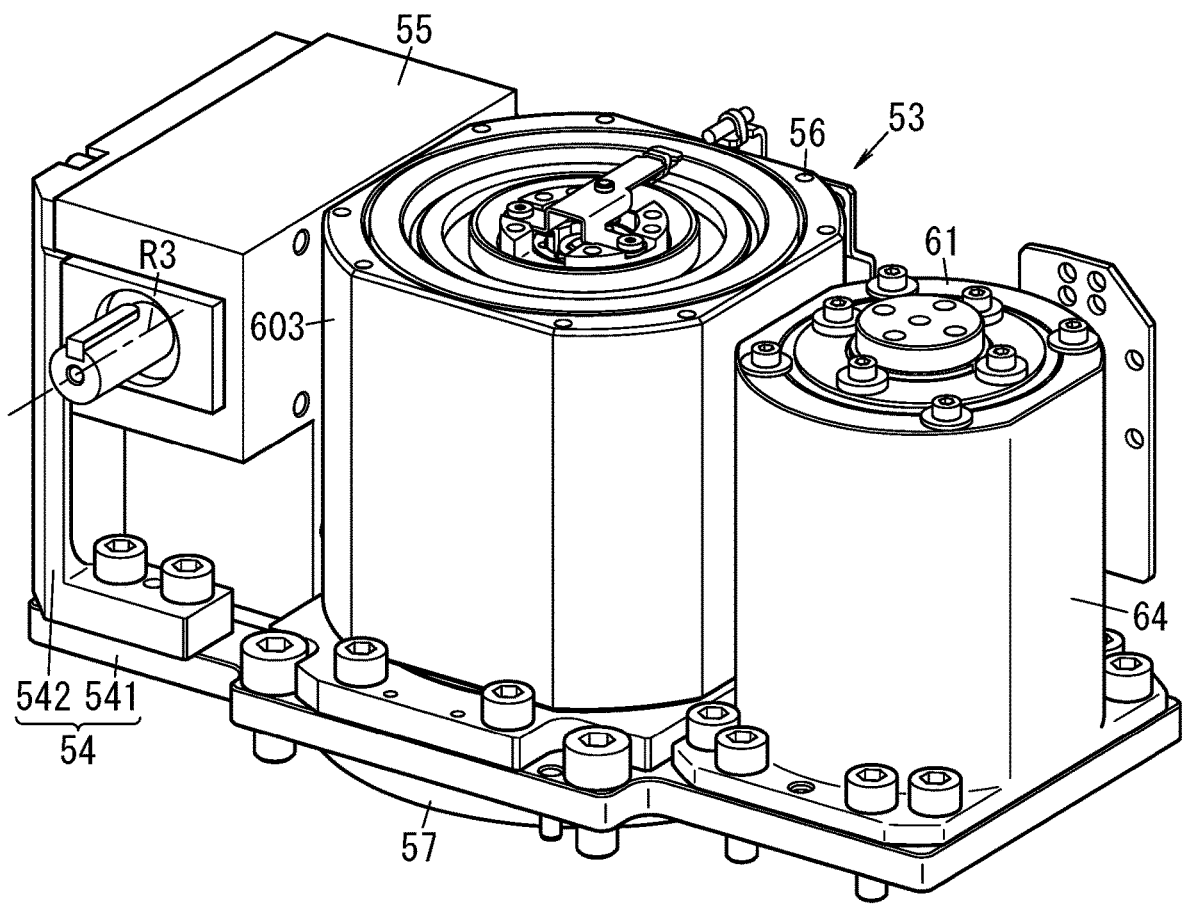
FIG. 7 is a perspective view of a supporting unit for the moving body.

Each pair of supporting units 53 is provided to elevate and lower their associated elevator unit 70. In this embodiment, the plurality of supporting units 53 operates in synch and in conjunction with each other. Therefore, the elevating operation and lowering operation of the plurality of supporting units 53 are performed in synch with each other. FIG. 7 is a perspective view of one supporting unit 53. The supporting unit 53 includes an installation base 54, a gearbox 55, a supporting mechanism 56, and a guide unit 61.

(1.2.4.4.1) Installation Base

The installation base 54 is fixed onto the housing 7 with the gearbox 55, the supporting mechanism 56, and the guide unit 61 mounted thereon. In this embodiment, the installation base 54 includes a first plate 541 provided generally parallel to the traveling surface 100 and a second plate 542 attached to the first plate 541. The second plate 542 is provided to stand up from the first plate 541.

(1.2.4.4.2) Gearbox

Figure 8:
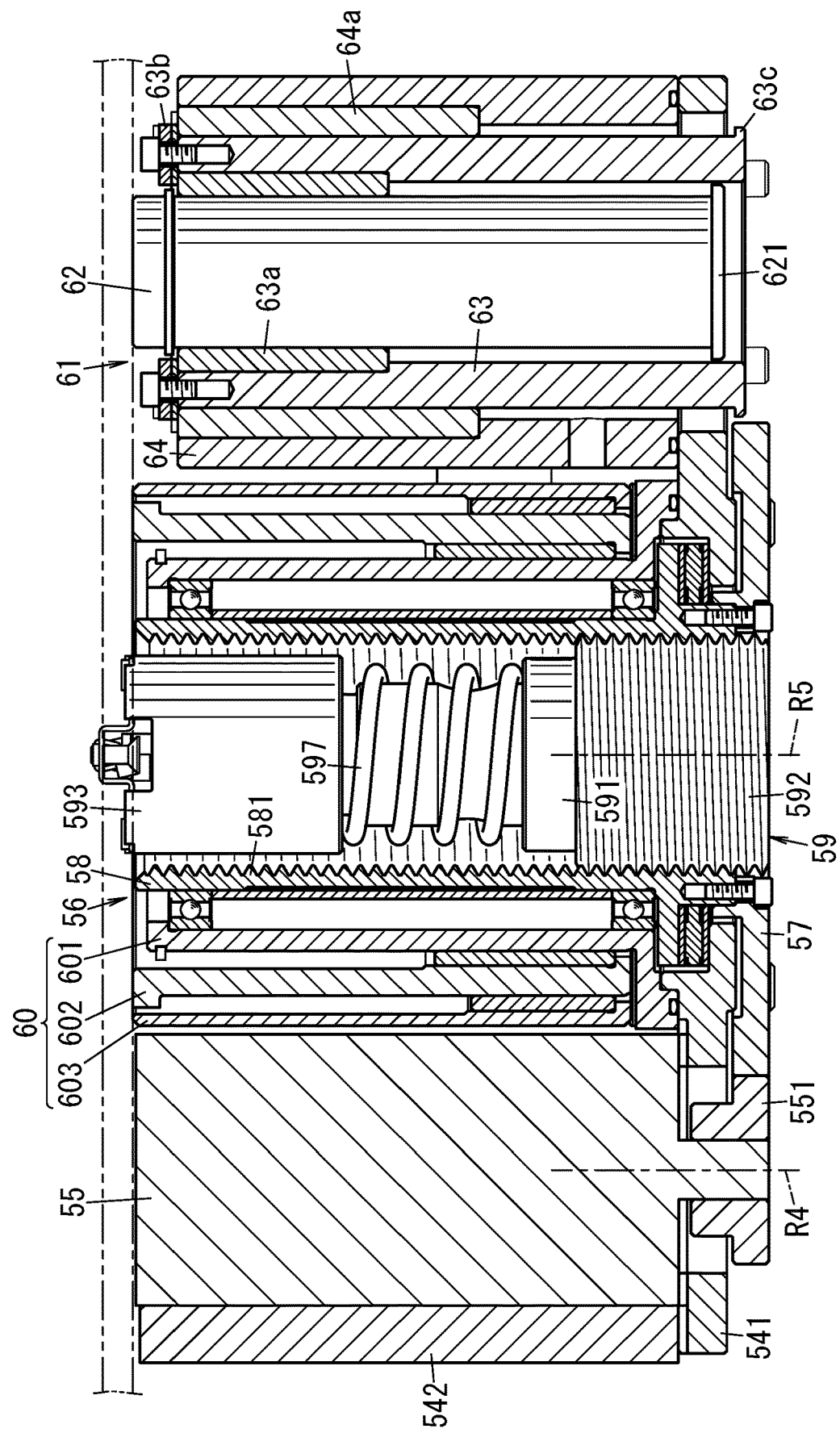
FIG. 8 is a cross-sectional view of the supporting unit.

The gearbox 55 is coupled to the drive shaft 52 and receives the motive power transmitted to around the rotary axis R3 of the drive shaft 52. The gearbox 55 includes a plurality of gears and outputs the motive power thus received as motive power transmitted to around a rotary axis R4 extending in the upward/downward directions as shown in FIG. 8. The output shaft of the gearbox 55 protrudes downward from the first plate 541. To the output shaft of the gearbox 55, fixed is a first gear 551 which is rotatable around the rotary axis R4.

In the gearbox 55 according to this embodiment, the rotary axis to which the input motive power is transmitted and the rotary axis to which the output motive power is transmitted cross each other at right angles. However, the angle formed between the rotary axis to which the input motive power is transmitted and the rotary axis to which the output motive power is transmitted does not have to be 90 degrees but may also be greater than 0 degrees and less than 90 degrees or may even be greater than 90 degrees. In other words, the rotary axis to which the input motive power is transmitted and the rotary axis to which the output motive power is transmitted just need to intersect with each other. Optionally, the gearbox 55 may have a speed reducing function of outputting a rotational velocity received as a different rotational velocity.

The first gear 551 meshes with a second gear 57 included in the supporting mechanism 56 and turns the second gear 57 around a rotary axis R5 aligned with the upward/downward directions.

(1.2.4.4.3) Supporting Mechanism

The supporting mechanism 56 is a mechanism designed to move in the upward/downward directions with the motive power provided by the elevator motor 510. In this embodiment, an upward movement of the supporting mechanism 56 causes the elevator unit 70 to be elevated, and a downward movement of the supporting mechanism 56 causes the elevator unit 70 to be lowered. That is to say, each supporting mechanism 56 supports an associated one of the plurality of elevator units 70 to cause the elevator unit 70 to be actuated in an elevating direction. As used herein, "to move in the upward/downward directions" means that at least part of the supporting mechanism 56 moves in the upward/downward directions, including a situation where only a part thereof moves while being deformed and a situation where the supporting mechanism 56 moves in its entirety. The same statement applies to the phrases "to move in the upward direction" and "to move in the downward direction."

The supporting mechanism 56 includes the second gear 57, a rotating cylinder 58, a mover 59, and an extensible/shrinkable cover 60.

The second gear 57 meshes with the first gear 551 and turns around the rotary axis R5 as the first gear 551 turns. In this embodiment, the second gear 57 is attached to the lower surface of the first plate 541 so as to be rotatable around the rotary axis R5. A central region of the second gear 57 is provided with a passage hole that penetrates through the second gear 57 in the upward/downward directions. The mover 59 is partially passed through the passage hole.

The rotating cylinder 58 is fixed to the second gear 57. As the rotating cylinder 58 rotates, the second gear 57 turns around the rotary axis R5. The rotating cylinder 58 is coupled to the second gear 57 so as to be concentric with the second gear 57. In this embodiment, the rotating cylinder 58 is screwed onto the second gear 57. Alternatively, the rotating cylinder 58 may also be coupled to the second gear 57 by welding, pinning, or engagement, for example. Still alternatively, the rotating cylinder 58 and the second gear 57 may also be formed integrally by casting or die-casing, for example.

The rotating cylinder 58 is formed in a cylindrical shape. The inner peripheral surface of the rotating cylinder 58 includes a first engaging portion 581. The first engaging portion 581 is a portion to be engaged with the mover 59. As used herein, if the first engaging portion 581 is "engaged with" the mover 59, it means that the first engaging portion 581 is engaged with the mover 59 to the point of allowing the mover 59 to move in the upward/downward directions by applying motive power from the rotating cylinder 58 to the mover 59. In this embodiment, the first engaging portion 581 is configured as an internal thread. The internal thread is a trapezoidal thread in this embodiment but may also be a square thread, a triangular thread, or a round thread, for example.

The mover 59 moves in the upward/downward directions as the rotating cylinder 58 rotates. The mover 59 is arranged inside the rotating cylinder 58 so as to be engaged with the first engaging portion 581 of the rotating cylinder 58. The upper end of the mover 59 is fixed onto the elevator unit 70 (specifically, to a backup plate 75 thereof). As the rotating cylinder 58 rotates, the mover 59 moves in the upward/downward directions but does not rotate around the rotary axis R5. In this embodiment, the mover 59 includes a shaft body 591, a movable part 593, and an elastic member 597.

The shaft body 591 moves in the upward/downward directions while being engaged with the first engaging portion 581. The shaft body 591 extends in the upward/downward directions. The shaft body 591 includes a second engaging portion 592 engaged with the first engaging portion 581. The second engaging portion 592 is formed on an outer peripheral surface at a lower end portion of the shaft body 591.

The second engaging portion 592 is a part to be engaged with the first engaging portion 581. As the rotating cylinder 58 rotates around the rotary axis R5, the second engaging portion 592 moves (in the upward/downward directions) along the rotary axis R5. The second engaging portion 592 is configured as an external thread in this embodiment. The external thread mates with the internal thread of the first engaging portion 581. In this embodiment, the external thread is configured as a trapezoidal thread. Nevertheless, if the internal thread of the first engaging portion 581 is a square thread, a triangular thread, or a round thread, then the second engaging portion 592 has such a corresponding shape.

Note that the first engaging portion 581 and the second engaging portion 592 do not have to be configured as internal and external threads in a specific embodiment, because the first engaging portion 581 and the second engaging portion 592 need to allow the shaft body 591 to move in the upward/downward directions while being engaged with each other. Alternatively, one of the first engaging portion 581 or the second engaging portion 592 may be configured as either a thread or a spiral groove, for example, and the other may be configured as a protrusion or a thread to be engaged with the spiral groove. Still alternatively, a structure such as a ball screw may also be adopted such that the first engaging portion 581 and the second engaging portion 592 are engaged with each other via interposed members such as a plurality of balls.

Figure 10:
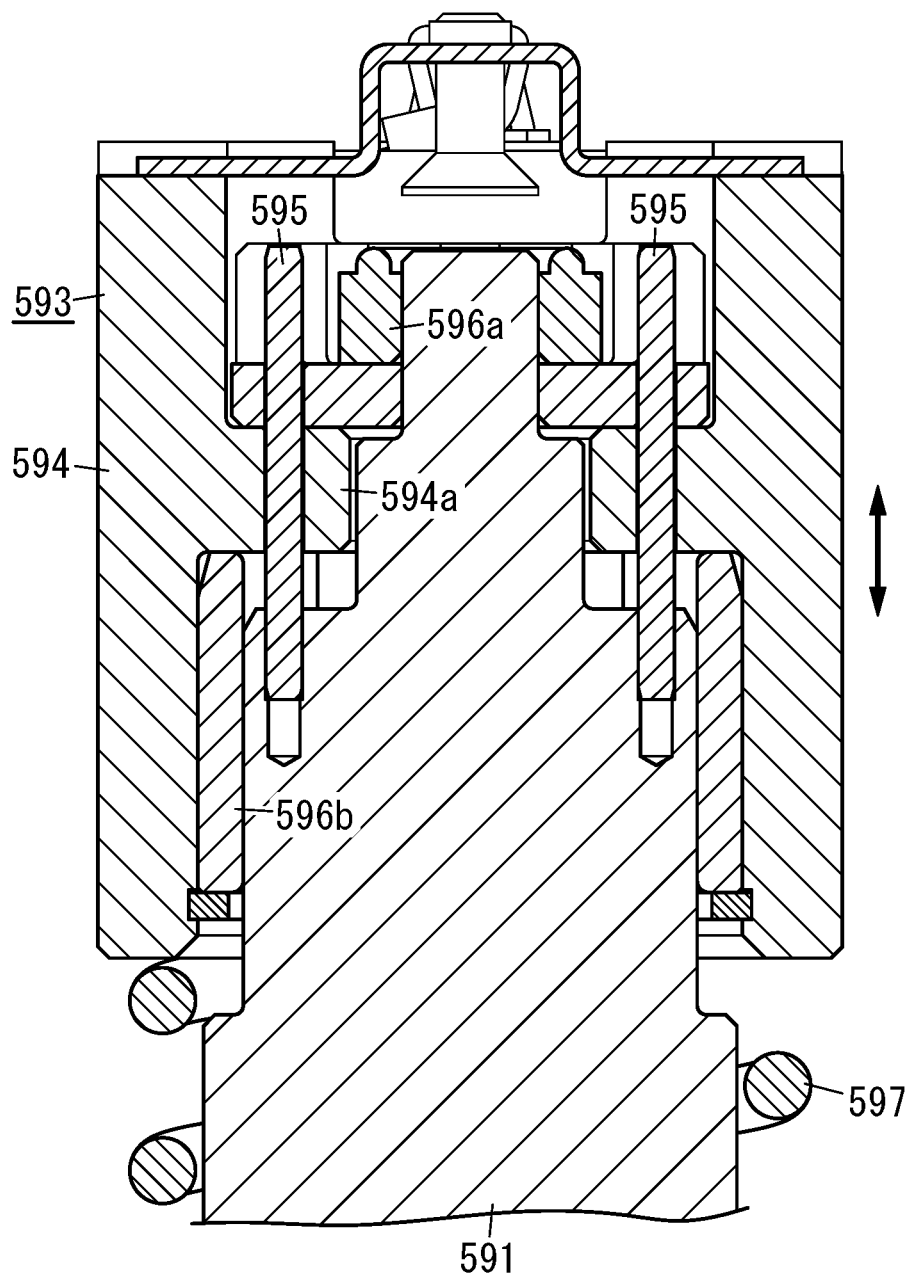
FIG. 10 is an enlarged cross-sectional view of a movable part of the supporting mechanism.

The movable part 593 is attached to the upper end portion of the shaft body 591 so as to be movable along the center axis of the shaft body 591. Attaching the movable part 593 to the upper end portion of the shaft body 591 allows the shock provided by the burden X1 to the elevator unit 70 to be absorbed. The movable part 593 is always pressed upward by the elastic member 597. The movable part 593 includes a movable part body 594, a plurality of guide pins 595, and a plurality of sleeve bearings 596a, 596b, as shown in FIG. 10.

The movable part body 594 is formed in a cylindrical shape and includes a middle partition 594a, which is provided in a middle portion in the upward/downward directions of the movable part body 594 so as to protrude toward the center of the movable part body 594. The middle partition 594a has a plurality of holes to pass the respective guide pins 595. The movable part body 594 moves along the longitudinal axis (in the upward/downward directions) of the respective guide pins 595.

The guide pins 595 guide the movable part body 594 in its movement. The longitudinal axis of the guide pins 595 is aligned with the upward/downward directions. The respective lower end portions of the guide pins 595 are fixed to the upper end portion of the shaft body 591. The plurality of guide pins 595 are arranged at equal pitches around the rotary axis R5 (see FIG. 8).

The sleeve bearings 596a, 596b are provided to reduce the frictional force caused when the movable part body 594 moves in the upward/downward directions with respect to the shaft body 591. The sleeve bearings 596a, 596b are arranged between the inner surface of the movable part body 594 and the outer surface of the shaft body 591. In this embodiment, the sleeve bearings 596a, 596b are formed in a cylindrical shape and attached to the inner surface of the movable part body 594.

The elastic member 597 presses the movable part 593 upward. In this embodiment, the elastic member 597 is configured as a coil spring. However, the elastic member 597 does not have to be a coil spring but just needs to have a spring property. Alternatively, the elastic member 597 may also be a leaf spring (including a thin leaf spring), a disc spring, a rubber spring, an air spring, anti-vibration rubber or cushion rubber, for example.

Figure 9:
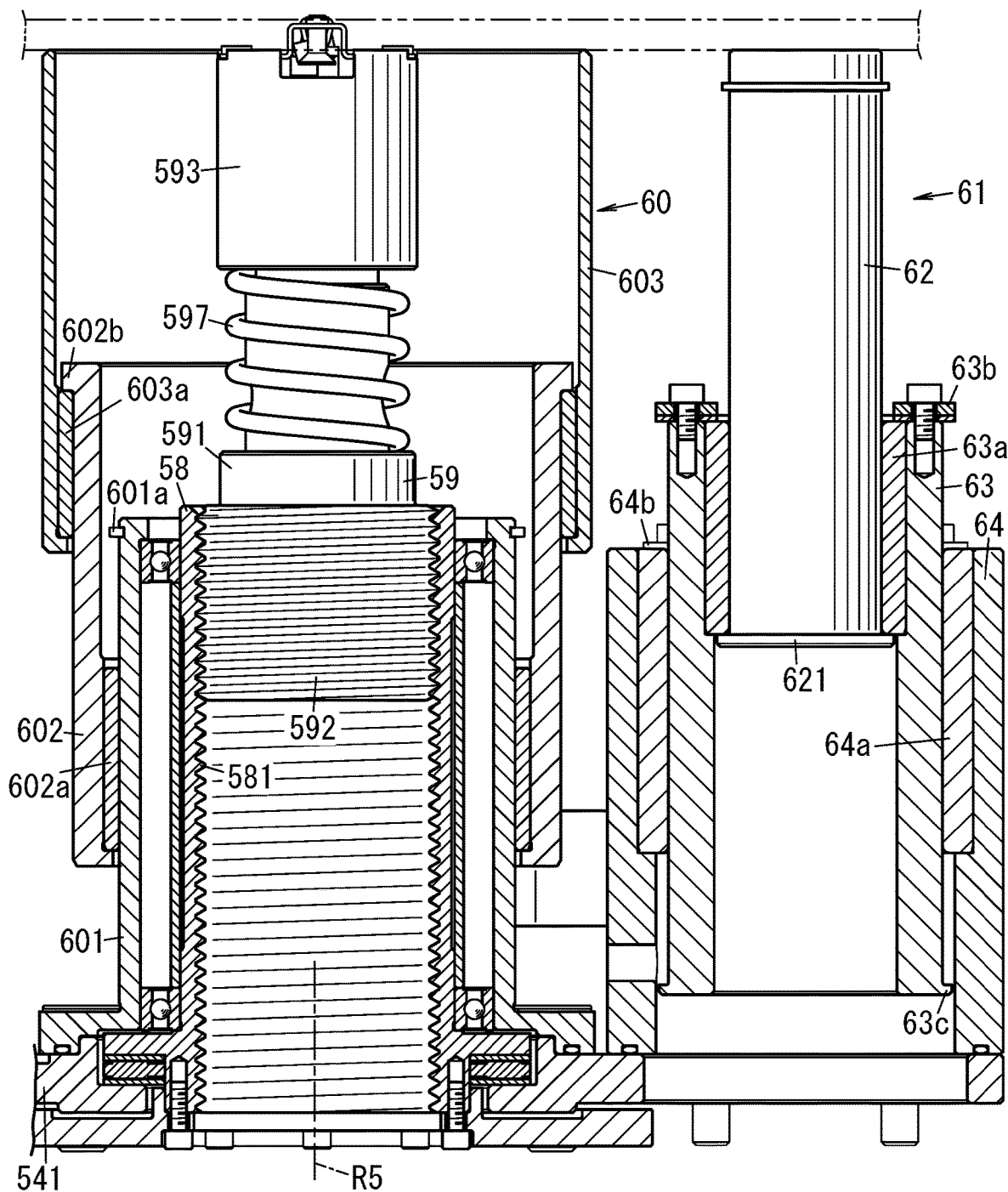
FIG. 9 is a cross-sectional view illustrating a state where a supporting mechanism of the supporting unit has been actuated upward.

As shown in FIG. 9, the extensible/shrinkable cover 60 is a cover that expands or shrinks as the mover 59 moves. The extensible/shrinkable cover 60 covers the outer peripheral surface of the mover 59 and rotating cylinder 58. The upper end of the extensible/shrinkable cover 60 is fixed to the elevator unit 70 (specifically, secured to a backup plate 75 thereof). As the mover 59 moves in the upward direction, the elevator unit 70 is elevated and the extensible/shrinkable cover 60 is extended in the upward direction. Meanwhile, as the mover 59 moves in the downward direction, the elevator unit 70 is lowered and the extensible/shrinkable cover 60 is shrunk in the downward direction. In this embodiment, the extensible/shrinkable cover 60 includes a fixed cylinder portion 601, a first moving cylinder portion 602, and a second moving cylinder portion 603.

The fixed cylinder portion 601 is fixed to the first plate 541. The fixed cylinder portion 601 has a larger outside diameter than, and is arranged concentrically with, the rotating cylinder 58. A plurality of bearings are arranged between the fixed cylinder portion 601 and the rotating cylinder 58. These bearings allow the rotating cylinder 58 to rotate smoothly around the rotary axis R5 with respect to the fixed cylinder portion 601. At the upper end of the fixed cylinder portion 601, provided is a first retention portion 601a for preventing the first moving cylinder portion 602 from being drawn out in the upward direction.

The first moving cylinder portion 602 is movable in the upward/downward directions with respect to the fixed cylinder portion 601. The first moving cylinder portion 602 has a larger outside diameter than, and is arranged concentrically with, the fixed cylinder portion 601. Between the first moving cylinder portion 602 and the fixed cylinder portion 601, arranged is a cylindrical thrust bearing 602a. The thrust bearing 602a allows the first moving cylinder portion 602 to move smoothly in the upward/downward directions with respect to the fixed cylinder portion 601. At the upper end of the first moving cylinder portion 602, provided is a second retention portion 602b for preventing the second moving cylinder portion 603 from being drawn out in the upward direction with respect to the first moving cylinder portion 602.

The second moving cylinder portion 603 is movable in the upward/downward directions with respect to the first moving cylinder portion 602. The second moving cylinder portion 603 has a larger outside diameter than, and is arranged concentrically with, the first moving cylinder portion 602. Between the second moving cylinder portion 603 and the first moving cylinder portion 602, arranged is a cylindrical thrust bearing 603a. The thrust bearing 603a allows the second moving cylinder portion 603 to move smoothly in the upward/downward directions with respect to the first moving cylinder portion 602.

The upper end of the second moving cylinder portion 603 is fixed to the backup plate 75 (see FIG. 14) of the housing 7 as described above. Thus, as the mover 59 moves in the upward direction, the elevator unit 70 is elevated and the second moving cylinder portion 603 moves in the upward direction accordingly as shown in FIG. 9. While the second moving cylinder portion 603 is moving in the upward direction, the lower end of the second moving cylinder portion 603 is hooked by the second retention portion 602b of the first moving cylinder portion 602 via the sleeve bearing 603a, thus lifting the first moving cylinder portion 602 in the upward direction. This causes the extensible/shrinkable cover 60 to be extended in the upward direction.

As can be seen from the foregoing description, the extensible/shrinkable cover 60 according to this embodiment is a so-called "telescopic pipe" cover including the fixed cylinder portion 601, the first moving cylinder portion 602, and the second moving cylinder portion 603. Alternatively, the extensible/shrinkable cover 60 may also be a bellows cover or a cover in which an upper cylinder fixed to the elevator unit 70 and a lower cylinder fixed to the first plate 541 are nested one on top of the other.

(1.2.4.4.4) Guide Unit

The guide unit 61 is a part for guiding the supporting mechanism 56 in its movement in the upward/downward directions. The guide unit 61 is arranged adjacent to the supporting mechanism 56 as shown in FIG. 7. The guide unit 61 is secured to the first plate 541. The guide unit 61 includes a moving shaft 62, a first guide cylinder member 63, and a second guide cylinder member 64 as shown in FIG. 9.

The moving shaft 62 is fixed to the elevator unit 70 (specifically, secured to the backup plate 75 thereof). The moving shaft 62 is in the form of a shaft in this embodiment but may have a solid structure or a hollow structure, whichever is appropriate. The moving shaft 62 extends in the upward/downward directions and has a flange portion 621 as a lower end portion thereof.

The first guide cylinder member 63 is a member that is movable along the longitudinal axis (i.e., the upward/downward directions) of the moving shaft 62 with respect to the moving shaft 62. Between the first guide cylinder member 63 and the moving shaft 62, arranged is a thrust bearing 63a. At the upper end of the first guide cylinder member 63, provided is an upper retention portion 63b for preventing the thrust bearing 63a from being drawn out in the upward direction. At the lower end of the first guide cylinder member 63, provided is a lower retention portion 63c to be hooked on the upper end of the second guide cylinder member 64.

The second guide cylinder member 64 is a member that is movable in the upward/downward directions with respect to the first guide cylinder member 63. Between the first guide cylinder member 63 and the second guide cylinder member 64, arranged is a thrust bearing 64a. At the upper end of the second guide cylinder member 64, provided is an upper retention portion 64b for preventing the thrust bearing 64a from being drawn out in the upward direction. The lower end of the second guide cylinder member 64 is fixed to the first plate 541.

The upper end of the moving shaft 62 is fixed to the elevator unit 70 as described above. Thus, as the supporting mechanism 56 moves in the upward direction, the elevator unit 70 is elevated and the moving shaft 62 also moves in the upward direction accordingly as shown in FIG. 9. As the moving shaft 62 moves in the upward direction, the flange portion 621 of the moving shaft 62 comes into contact with the thrust bearing 63a, thus lifting the first guide cylinder member 63 in the upward direction. At this time, the first guide cylinder member 63 is guided by the second guide cylinder member 64 in its movement in the upward/downward directions, and the moving shaft 62 is guided by the first guide cylinder member 63 in its movement in the upward/downward directions.

(1.2.4.5) Loading Sensor

Figure 13:
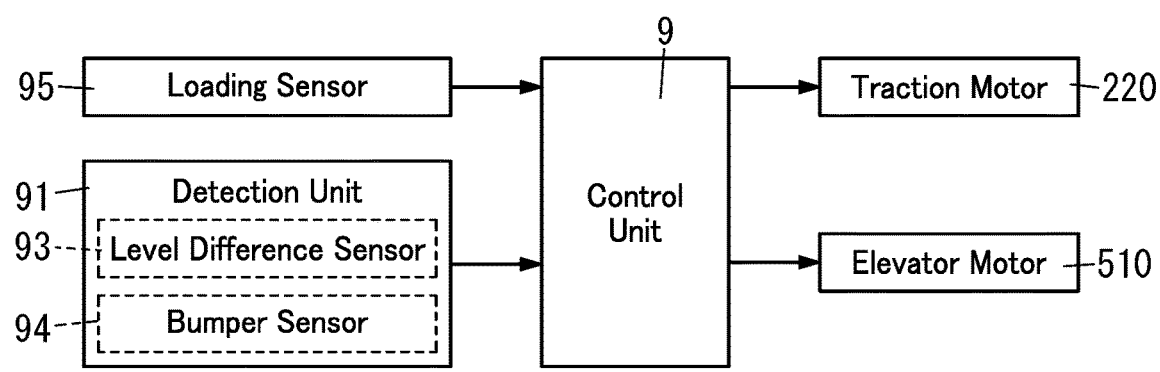
FIG. 13 is a block diagram of the moving body.

The loading sensor 95 shown in FIG. 13 senses the burden X1 be loaded on each elevator unit 70. The loading sensor 95 may be attached to, for example, the upper end portion of the mover 59 of the supporting mechanism 56 (see FIG. 8). In this embodiment, the loading sensor 95 is a noncontact sensor and is specifically implemented as a proximity sensor. Although an inductive proximity sensor is used in this embodiment as the proximity sensor, a capacitive sensor may also be used. Alternatively, the noncontact sensor may also be an ultrasonic sensor, a photoelectric sensor, or any other type of sensor, which is selected as appropriate according to the attribute of the burden X1. Furthermore, the loading sensor 95 does not have to be a noncontact sensor but may also be a contact sensor. The contact sensor may be a weight sensor, for example.

In this embodiment, the loading sensor 95 senses, by outputting a result of detection that the burden X1 has been brought close to the loading sensor 95, the burden X1 be loaded on the elevator unit 70. In this embodiment, as the elevator unit 70 is elevated under the burden X1, the elevator unit 70 comes into contact with the lower surface of the burden X1. In that case, when the lower surface of the burden X1 comes into contact with the elevator unit 70, the loading sensor 95 outputs a result of detection that the burden X1 has been brought close to the loading sensor 95. Thus, the loading sensor 95 senses the burden X1 be loaded on the elevator unit 70.

In this embodiment, a plurality of loading sensors 95 are provided for the plurality of elevator units 70. Thus, if the lower surface of the burden X1 has a level difference, for example, then a time lag will be caused between the respective timings of detection of the burden X1 by the loading sensors 95. The results of detection by these loading sensors 95 are provided to the control unit 9 to be described later.

(1.2.5) Detection Unit

The detection unit 91 detects, for example, the behavior of the carrier 1 and the surroundings of the carrier 1. As used herein, the "behavior" refers to the operation, appearance, and other parameters of the carrier 1. Examples of the behavior of the carrier 1 include the operating status, which is either traveling or at a stop, of the carrier 1, the velocity (and variation in the velocity) of the carrier 1, acceleration applied to the carrier 1, and the orientation of the carrier 1. Specifically, the detection unit 91 includes some type of sensor such as a velocity sensor, an acceleration sensor, or a gyrosensor to detect the behavior of the carrier 1 using any of these sensors. The detection unit 91 also includes another type of sensor such as an image sensor (camera), a sonar sensor, a radar, or a light detection and ranging (LiDAR) sensor to detect the surroundings of the carrier 1 using any of these sensors. The surroundings of the carrier 1 include the presence or absence of any object (obstacle) in/from the traveling direction, and in front, of the carrier 1, and the location (including the distance and azimuth) of the object, if any. Examples of the obstacles include other moving bodies 1A and humans.

Figure 11:
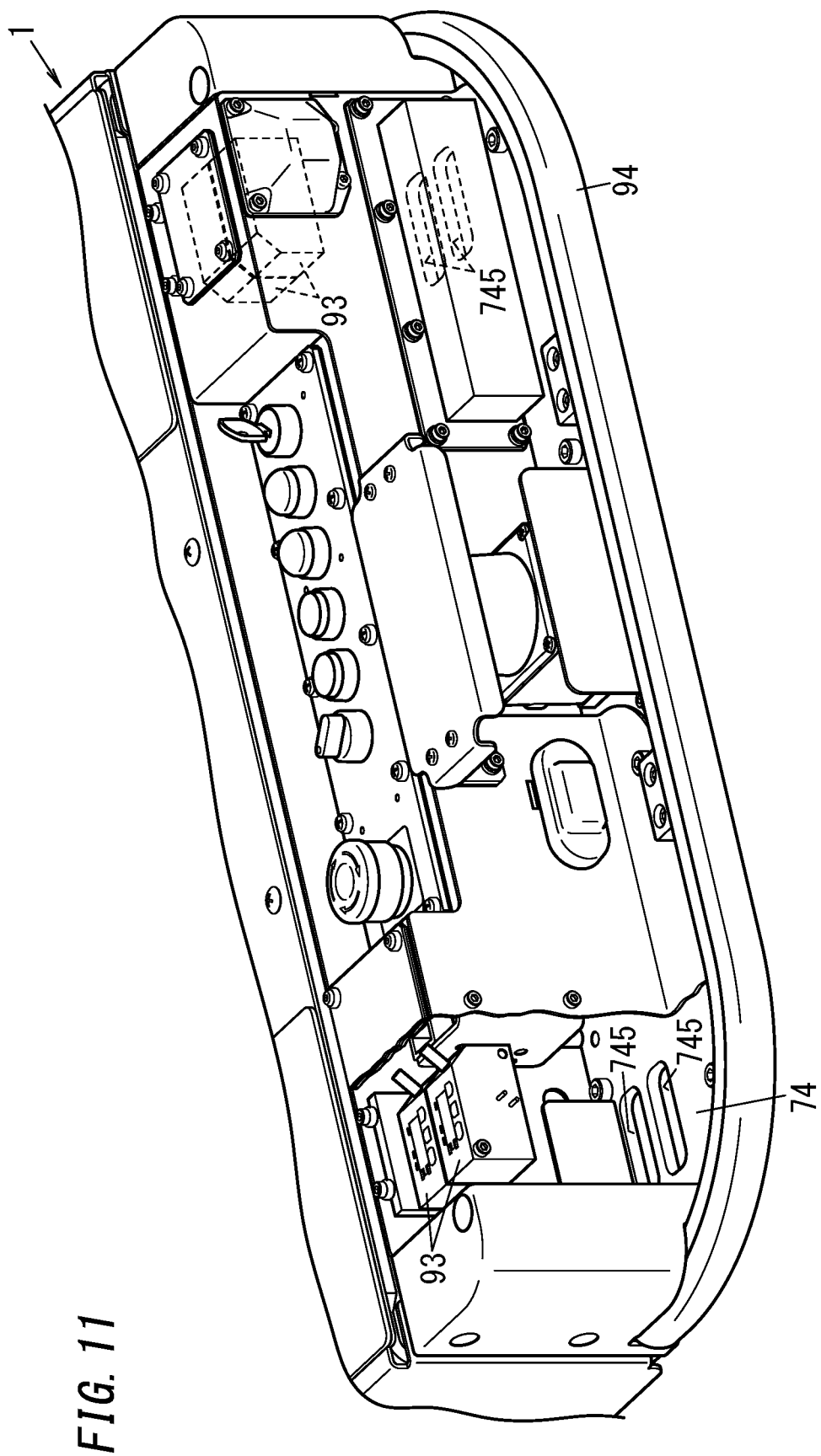
FIG. 11 is an enlarged perspective view of a front portion of the moving body.
Figure 12:
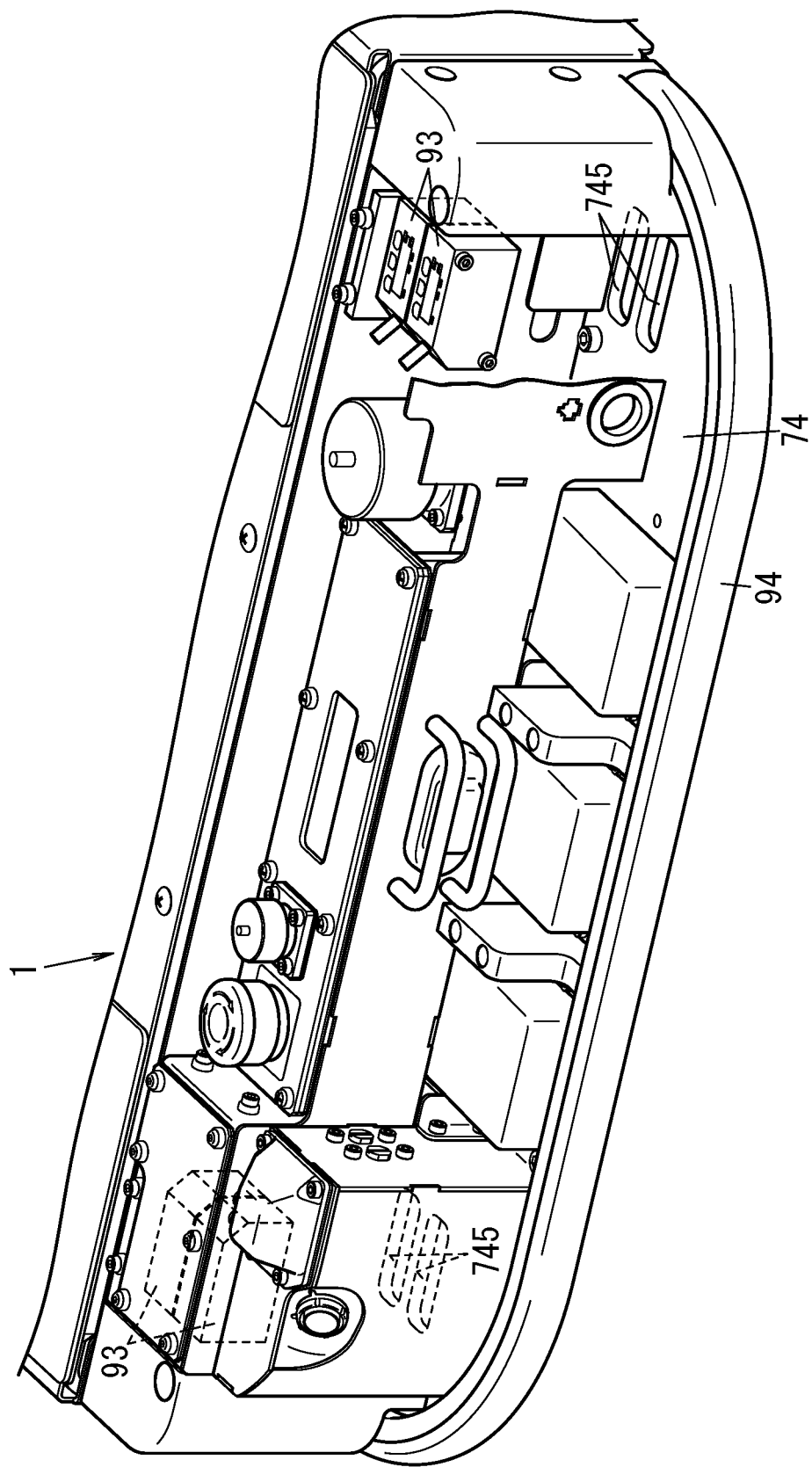
FIG. 12 is an enlarged perspective view of a rear portion of the moving body.

In this embodiment, the detection unit 91 includes a plurality of (e.g., four in this example) level difference sensors 93 and a plurality of (e.g., two in this example) bumper sensors 94 as shown in FIGS. 11 and 12. FIG. 11 is an enlarged view of a front portion of the moving body 1A according to this embodiment. FIG. 12 is an enlarged view of a rear portion of the moving body 1A according to this embodiment.

Each of the level difference sensors 93 detects a level difference on the traveling surface 100. In this embodiment, the level difference sensor 93 is implemented as an optical sensor (rangefinder sensor) for detecting any level difference by irradiating the traveling surface 100 with light. Specifically, the optical sensor irradiates an object with light emitted from a light-emitting element and receives reflected light at a photosensitive element. Then, the optical sensor measures, by the principle of triangulation, a distance to the object based on a point of incidence of the reflected light on the photosensitive element. Examples of the photosensitive element include a position sensor device (PSD), a complementary metal-oxide semiconductor (CMOS) sensor, and a charge-coupled device (CCD) sensor. However, the level difference sensor 93 does not have to be an optical sensor but may also be an ultrasonic rangefinder sensor, for example.

As shown in FIGS. 11 and 12, the bottom plate 74 has a plurality of holes 745 to pass the light emitted from the optical sensor. As the plurality of holes 745, provided are holes to pass outgoing light and holes to pass incoming light. Optionally, a hole to pass outgoing light and a hole to pass incoming light may be connected together to form a single hole 745. Also, although the holes 745 are not closed with a transparent plate in this embodiment, the holes 745 may be closed with a transparent plate.

As shown in FIGS. 11 and 12, the plurality of level difference sensors 93 are arranged at both the front and rear ends in the forward/backward directions of the housing 7. Furthermore, at the frontend of the housing 7, the direction in which the plurality of level difference sensors 93 are arranged side by side intersects with the forward/backward directions as shown in FIG. 11. In this embodiment, the direction in which the plurality of level difference sensors 93 are arranged side by side is parallel to the rightward/leftward directions. Likewise, at the rear end of the housing 7, the direction in which the plurality of level difference sensors 93 are arranged side by side also intersects with the forward/backward directions as shown in FIG. 12. In this embodiment, the direction in which the plurality of level difference sensors 93 are arranged side by side is parallel to the rightward/leftward directions. In other words, in this embodiment, the four level difference sensors 93 are arranged at the four corners of the housing 7. Thus, the plurality of level difference sensors 93 are placed at different locations from the traction motors 220, the elevator motors 510, and the battery 92 in a plan view.

Such level difference sensors 93 are connected to the control unit 9 so as to be able to transmit an electrical signal thereto and may output a result of detection to the control unit 9.

The bumper sensors 94 detect that the carrier 1 has collided against an obstacle while traveling. The bumper sensors 94 are provided at both the front and rear end portions in the forward/backward directions of the bottom plate 74 of the housing 7. On detecting its collision against any obstacle, the bumper sensor 94 outputs the result of detection to the control unit 9. In this embodiment, the bumper sensors 94 are used as sensors for an emergency stop.

(1.2.6) Control Unit

The control unit 9 shown in FIG. 13 controls the drive of the plurality of traction motors 220 and the plurality of elevator motors 510. The control unit 9 is connected to the plurality of traction motors 220, the plurality of elevator motors 510, the loading sensor 95, and the detection unit 91. In this embodiment, the control unit 9 outputs, in accordance with an instruction given by an instruction unit such as an external server, a control signal to the traction motors 220 and the elevator motors 510.

The control unit 9 includes, as its major constituent element, a microcontroller including one or more processors and one or more memories. That is to say, the microcontroller performs the functions of the control unit 9 by making its processor execute a program stored in its memory. The program may be stored in advance in the memory. Alternatively, the program may also be downloaded via a telecommunications line such as the Internet or distributed after having been stored in a non-transitory storage medium such as a memory card.

On receiving the electrical signals representing the results of detection from the loading sensor 95 and the detection unit 91, the control unit 9 controls the operations of the elevator motors 510 and the traction motors 220 based on the results of detection. An exemplary operation of the elevator motors 510 and traction motors 220 under the control of the control unit 9 according to this embodiment will be described in detail later in the "(1.3) Operation" section.

In addition, in this embodiment, the control unit 9 also performs, based on the result of detection by the loading sensor 95 provided for a first elevator unit 771 (see FIG. 14) and the result of detection by the loading sensor 95 provided for a second elevator unit 781, determination processing of determining the type of the burden X1. For example, the control unit 9 may acquire the amount of time T1 it takes for the loading sensor 95 provided for the first elevator unit 771 to detect the burden X1 from a reference point in time and the amount of time T2 it takes for the loading sensor 95 provided for the second elevator unit 781 to detect the burden X1 from the reference point in time and calculate the difference T3 between T1 and T2. Then, based on this T3 value, the control unit 9 may determine the type of the burden X1 according to the shape of its lower surface.

In this embodiment, the "reference point in time" is a point in time when the first elevator unit 771 and the second elevator unit 781 start to operate. However, this is only an example of the present disclosure and should not be construed as limiting. Alternatively, the reference point in time may also be a point in time during the operation of the first elevator unit 771 and the second elevator unit 781.

The control unit 9 determines the type of the burden X1 and changes the operation of the traction motors 220 and the elevator motors 510 accordingly. For example, the control unit 9 may change the operation of the carrier 1 on a load-by-load basis by determining the type of the load to carry based on the shape of the bottom surface of the burden X1 (i.e., the shape of the bottom of the roll box pallet). For example, the control unit 9 may change, according to the type of the given load, the degree to which the burden X1 is lifted and the traveling velocity of the carrier 1.

(1.2.7) Battery

The battery 92 (see FIG. 17) supplies electric power to the traction motors 220 and the elevator motors 510. Specifically, the battery 92 supplies electric power to the traction motors 220 and the elevator motors 510 via the control unit 9. However, this is only an example of the present disclosure and should not be construed as limiting. Alternatively, the battery 92 may supply electric power directly to the traction motors 220 and the elevator motors 510. In this embodiment, the battery 92 is implemented as a lithium-ion battery. Alternatively, the battery 92 may also be a lead-acid battery, a nickel-hydrogen battery, or a sodium-sulfur (NAS) battery, for example.

In this embodiment, the battery 92 is arranged between the traction motors 220 and the elevator mechanism 5 provided for the front portion of the housing 7 (see FIG. 17).

(1.2.8) Housing

Figure 14:
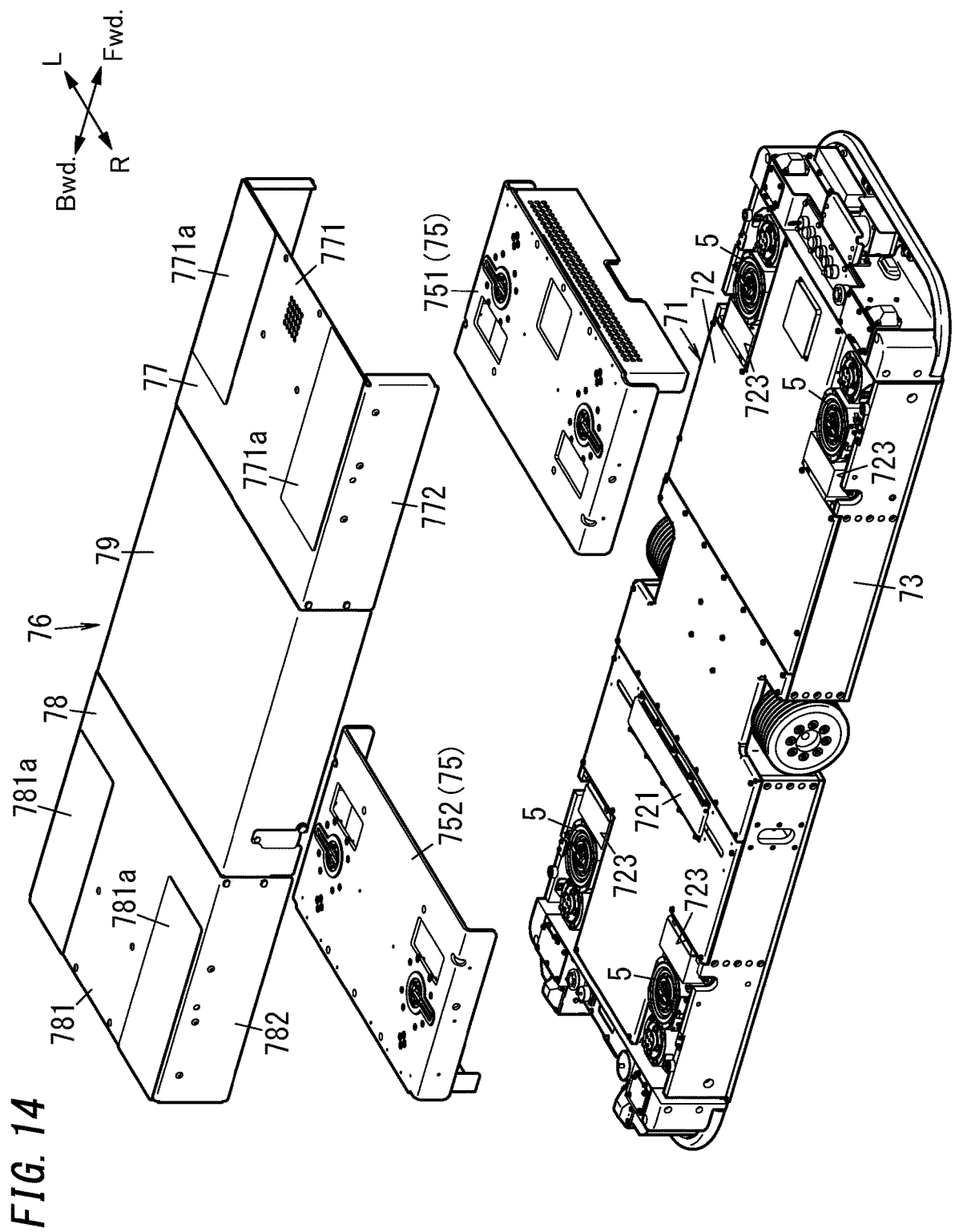
FIG. 14 is an exploded perspective view of the moving body.

The housing 7 houses the control unit 9, the traction motors 220, the elevator mechanisms 5 each including the elevator motor 510, and other members. As shown in FIG. 14, the housing 7 includes a housing body 71, a plurality of backup plates 75, and a cover 76.

The housing body 71 is a member forming a major part of the housing 7. The housing body 71 is formed in the shape of a rectangular parallelepiped, of which the dimension measured in the forward/backward directions is greater than its dimension measured in the rightward/leftward directions and of which the dimension measured in the upward/downward directions is less than its dimension measured in the rightward/leftward directions or the forward/backward directions. As described above, the dimension of the housing 7 as measured in the upward/downward directions is much smaller than its dimension as measured in the rightward/leftward directions so as to allow the housing 7 according to this embodiment to easily slip into the gap under the burden X1. The housing body 71 includes a top plate 72, a plurality of side plates 73, and the bottom plate 74 (see FIG. 15).

The top plate 72 is a plate that forms a surface, facing upward, of the housing body 71. The top plate 72 has four openings provided at the four corners in a plan view (hereinafter referred to as "elevator mechanism openings 723") and another opening to take in the air (hereinafter referred to as an "air inlet 721"). These openings 721, 723 penetrate through the top plate 72 along the thickness axis thereof and communicate with the inside of the housing body 71. As used herein, the "four corners" refer to portions, located at the front and rear ends and right and left ends, of the housing body 71 and each having a certain range.

Each of the plurality of elevator mechanisms 5 is housed at least partially in the housing body 71. Each elevator mechanism 5 is located inside the elevator mechanism openings 723 in a plan view. As the supporting mechanisms 56 move upward, the supporting mechanisms 56 pass through the elevator mechanism openings 723 to protrude upward from the upper surface of the top plate 72.

The plurality of side plates 73 are plates crossing the top plate 72 and the bottom plate 74 and forming surfaces, facing outward (more specifically, outward and sideways) in the direction parallel to the traveling surface 100, of the housing body 71.

Figure 15:
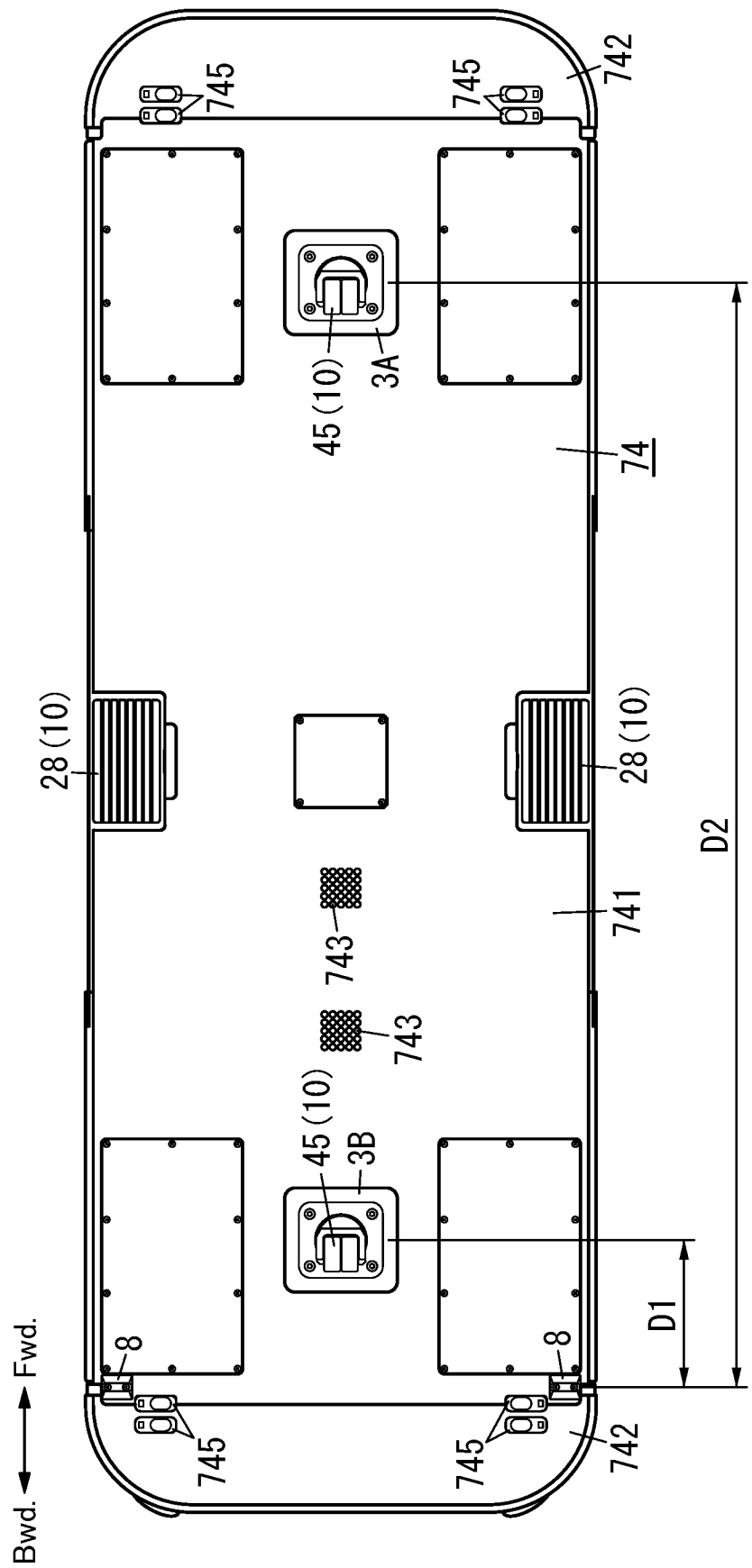
FIG. 15 is a bottom view of the moving body.

The bottom plate 74 is a plate forming a surface, facing downward, of the housing 7. The lower surface of the bottom plate 74 faces the traveling surface 100. The bottom plate 74 is formed in the shape of a flat plate. As shown in FIG. 15, the bottom plate 74 includes a bottom plate body 741 and a plurality of (e.g., two in this example) adjacent portions 742.

The bottom plate body 741 forms a majority of the bottom plate 74. In this embodiment, the bottom plate body 741 overlaps with the top plate 72 in a plan view. The bottom plate body 741 has a plurality of (e.g., four in this example) corner portions. Each corner portion is a portion with a range including a corner formed by a side, extending in the forward/backward directions, of the bottom plate 74 and another side thereof extending in the rightward/leftward direction. In this embodiment, the bottom plate body 741 is made of a metallic material. However, this is only an example of the present disclosure and should not be construed as limiting. The bottom plate body 741 may also be made of a hard resin, carbon, wood, or any other suitable material.

Figure 22:
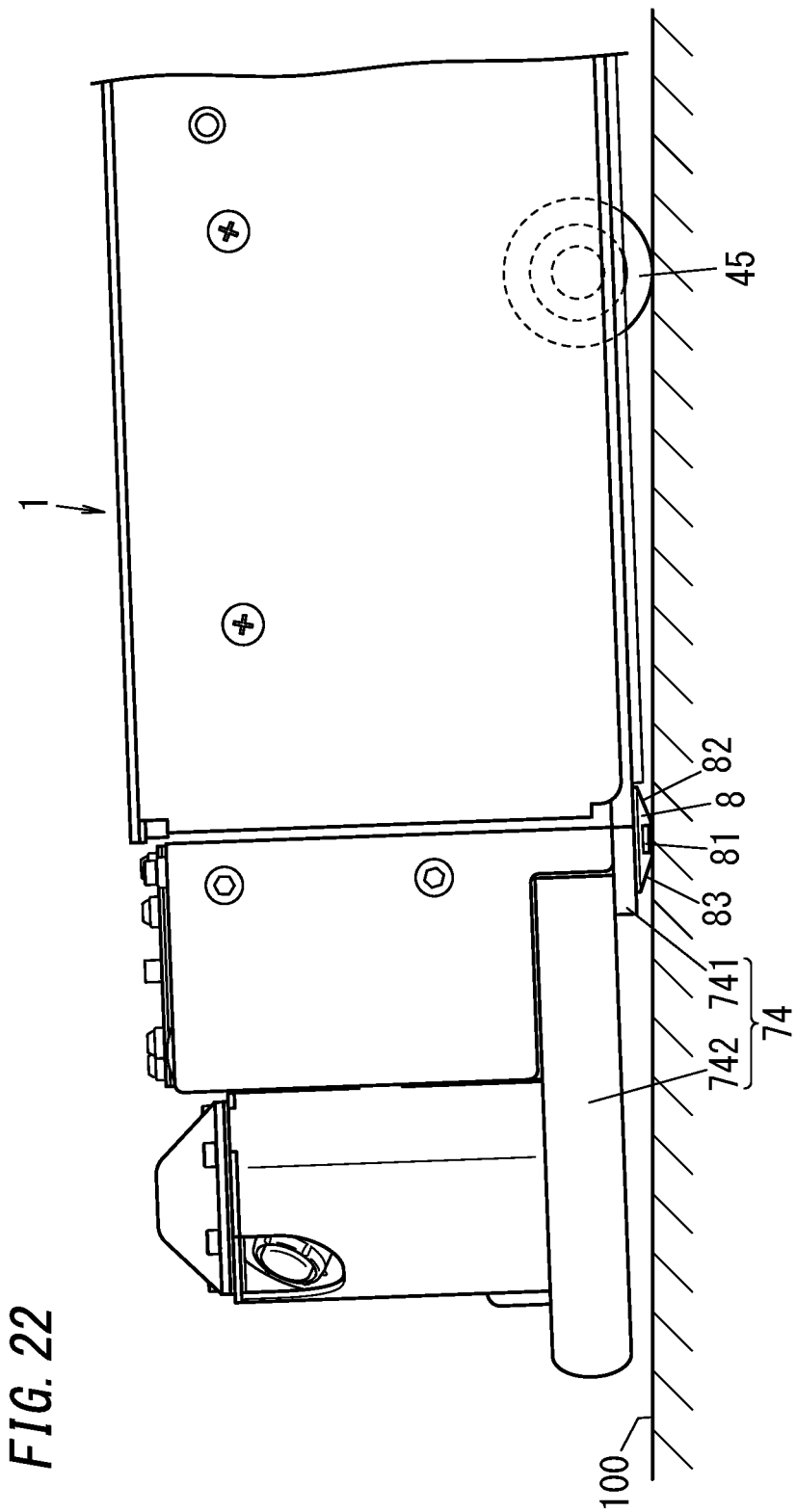
FIG. 22 is a side view of the rear portion of the moving body.

Each of the adjacent portions 742 is a plate arranged adjacent to corner portions of the bottom plate body 741. In this embodiment, the plurality of adjacent portions 742 are arranged on both sides in the forward/backward directions of (i.e., in front of and behind) the bottom plate body 741. In this embodiment, the respective adjacent portions 742 are attached to the bottom plate body 741 such that the respective lower surfaces of the adjacent portions 742 are located above the lower surface of the bottom plate body 741 as shown in FIG. 22. Each adjacent portion 742 is made of a metallic material (e.g., aluminum in this embodiment). The bottom plate body 741 and the adjacent portions 742 may be made of the same material or mutually different materials, whichever is appropriate.

As shown in FIG. 14, the plurality of backup plates 75 are provided as reinforcing plates to support the cover 76 thereon. In this embodiment, the backup plates 75 are thicker than the cover 76. The plurality of backup plates 75 are provided between the housing body 71 and the cover 76. The plurality of backup plates 75 are arranged to face the first elevator unit 771 and the second elevator unit 781, respectively. In the following description, the backup plate 75 facing the first elevator unit 771 will be hereinafter referred to as a "first backup plate 751" and the backup plate 75 facing the second elevator unit 781 will be hereinafter referred to as a "second backup plate 752."

The first backup plate 751 is arranged at a position where the first backup plate 751 overlaps with the elevator mechanism 5 provided for the front portion of the housing 7 in a plan view. To the first backup plate 751, attached are the plurality of supporting mechanisms 56, the plurality of second moving cylinder portions 603, and the respective moving shafts 62 of the plurality of guide units 61 of the elevator mechanism 5. This causes, as the supporting mechanisms 56 move upward, the first backup plate 751 and the first elevator unit 771 to be both elevated.

The second backup plate 752 is arranged at a position where the second backup plate 752 overlaps with the elevator mechanism 5 provided for the rear portion of the housing 7 in a plan view. To the second backup plate 752 as well as the first backup plate 751, also attached are the plurality of supporting mechanisms 56, the plurality of second moving cylinder portions 603, and the respective moving shafts 62 of the plurality of guide portions 61 of the elevator mechanism 5 in the rear portion of the housing 7. This causes, as the supporting mechanisms 56 move upward, the second backup plate 752 and the second elevator unit 781 to be both elevated.

The cover 76 covers the housing body 71 at least from over the housing body 71. The cover 76 includes a first cover 77, a second cover 78, and an intermediate cover 79.

The first cover 77 covers a front portion of the top plate 72 of the housing body 71. The first cover 77 includes the first elevator unit 771 and a pair of side surface portions 772. The first elevator unit 771 is a portion which is elevated and lowered with respect to the traveling surface 100 to load the burden X1 thereon. The first elevator unit 771 may be elevated and lowered as the elevator mechanism 5 moves upward or downward. The first elevator unit 771 includes a pair of slip resistant portions 771a, which are provided separately from each other in the rightward/leftward directions to prevent the burden X1 from slipping.

The second cover 78 covers a rear portion of the top plate 72 of the housing body 71. The second cover 78 includes the second elevator unit 781 and a pair of side surface portions 782. The second elevator unit 781, as well as the first elevator unit 771, is a portion which is elevated and lowered with respect to the traveling surface 100 to load the burden X1 thereon. The second elevator unit 781 may be elevated and lowered as the elevator mechanism 5 moves upward or downward. The second elevator unit 781 includes a pair of slip resistant portions 781a, which are provided separately from each other in the rightward/leftward directions to prevent the burden X1 from slipping. In this description, the first elevator unit 771 and the second elevator unit 781 will be hereinafter collectively referred to as "elevator units 70" if there is no need to distinguish the first elevator unit 771 and the second elevator unit 781 from each other.

Figure 16:
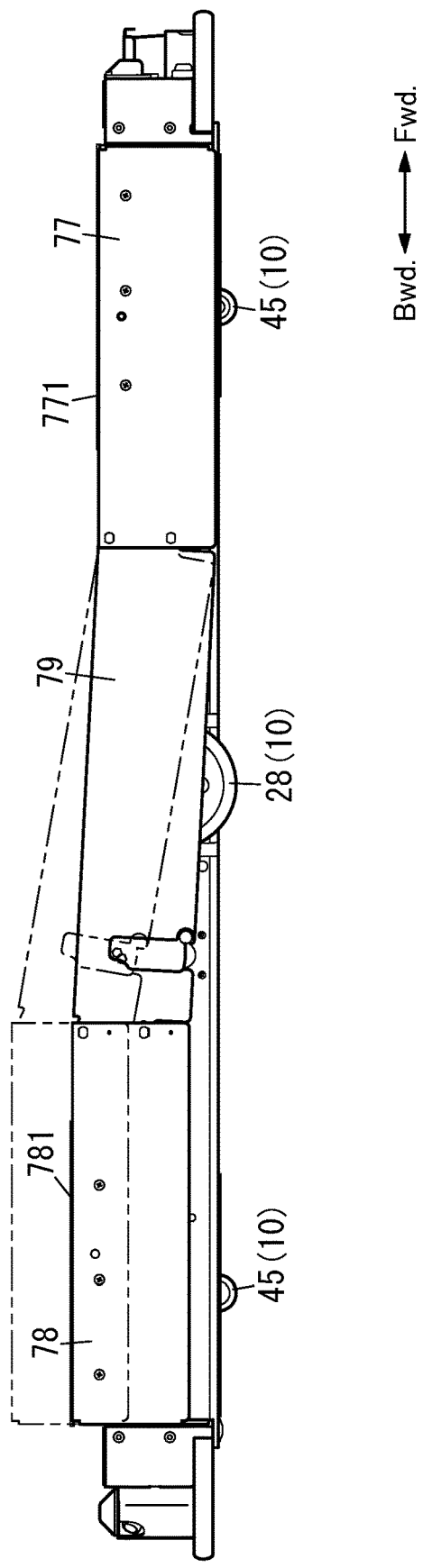
FIG. 16 is a side view of the moving body.

The intermediate cover 79 connects the first cover 77 and the second cover 78 together. The intermediate cover 79 is attached to the first cover 77 and the second cover 78 so as to be rotatable around an axis extending in the rightward/leftward directions. Thus, when the second elevator unit 781 is located at a higher level than the first elevator unit 771 as indicated in phantom in FIG. 16, the intermediate cover 79 is inclined downward from the second cover 78 toward the first cover 77. Meanwhile, if the first elevator unit 771 is located at a higher level than the second elevator unit 781, then the intermediate cover 79 is inclined downward from the first cover 77 toward the second cover 78. If the first elevator unit 771 and the second elevator unit 781 are level with each other, then the upper surface of the intermediate cover 79 is flush with the respective upper surfaces of the first cover 77 and the second cover 78.

(1.2.9) Arrangement of Devices

Next, the arrangement of devices to be housed in the housing 7 will be described. The carrier 1 according to this embodiment includes the plurality of elevator motors 510, the plurality of traction motors 220, the battery 92, and the plurality of level difference sensors 93 as shown in FIG. 17. These members, namely, the plurality of elevator motors 510, the plurality of traction motors 220, the battery 92, and the plurality of level difference sensors 93 are distributed in a plan view (i.e., when viewed perpendicularly to the traveling surface 100). As used herein, "to be distributed" means that respective elements do not overlap with each other in a plan view. For example, if two elements are just adjacent to each other and do not overlap with each other in a plan view, then the two elements may be regarded as being "distributed."

Also, as used herein, the "plurality of elevator motors 510," the "plurality of traction motors 220," the "battery 92," and the "plurality of level difference sensors 93" refer to only these members themselves, with cables and other accessories, for example, not included. Therefore, in a situation where two traction motors 220 are adjacent to each other, even if the cable of one of the two traction motors 220 overlaps with the cable of the other traction motor 220, these two traction motors 220 are also herein regarded as being "distributed." Likewise, in a situation where two traction motors 220 are adjacent to each other, even if the cable of one of the two traction motors 220 overlaps with the body of the other traction motor 220, these two traction motors 220 are also herein regarded as being "distributed."

Thus, the plurality of traction motors 220 and the battery 92 are arranged at mutually different positions in a plan view. As used herein, "to be arranged at mutually different positions," as well as "to be distributed," means that respective elements do not overlap with each other in a plan view, no matter how distant or close the elements are from/to each other.

Figure 18:
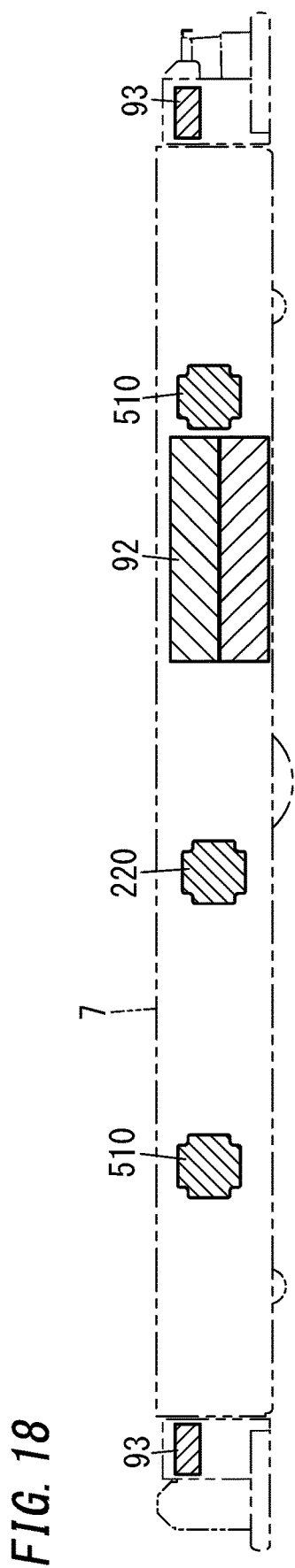
FIG. 18 is a side view of the moving body.

The plurality of elevator motors 510, the plurality of traction motors 220, the battery 92, and the plurality of detection units 91 are distributed in a plan view. Nevertheless, as shown in FIG. 18, the plurality of elevator motors 510, the plurality of traction motors 220, the battery 92, and the plurality of level difference sensors 93 are located at least partially on a single virtual plane parallel to the traveling surface 100 as shown in FIG. 18. In other words, the plurality of elevator motors 510, the plurality of traction motors 220, the battery 92, and the plurality of level difference sensors 93 overlap with each other at least partially when viewed parallel to the traveling surface 100. In particular, in this embodiment, the plurality of elevator motors 510, the plurality of traction motors 220, and the plurality of level difference sensors 93 all fall within thickness of the battery 92 (i.e., its dimension as measured in the upward/downward directions).

Thus, in the carrier 1 according to this embodiment, major parts thereof are not only distributed in a plan view but also fall within a predetermined height as measured in the upward/downward directions, thus allowing the dimension as measured in the upward/downward directions of the housing 7 to be reduced as much as possible. This provides a carrier 1, of which the height dimension is small enough for the carrier 1 to slip into the gap under the burden X1.

(1.2.10) Air Inlet and Air Outlet

Figure 19:
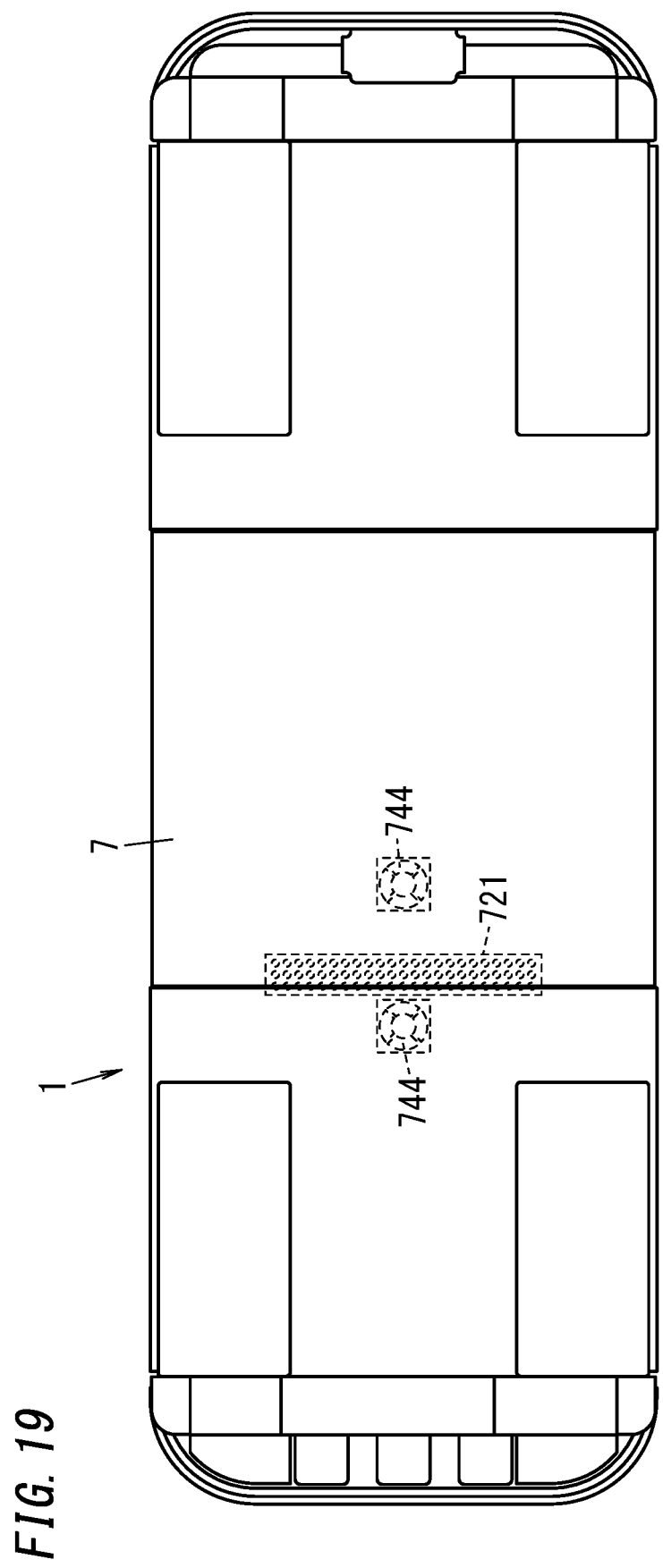
FIG. 19 is a plan view of the moving body.

FIG. 19 is a plan view of the carrier 1 according to this embodiment. The moving body 1A has an air inlet 721 and a plurality of air outlets 743 (see FIG. 20). Heat exchange is carried out between the air taken into the housing 7 through the air inlet 721 and at least one of the traction motors 220, the elevator motors 510, or the board on which the control unit 9 is implemented. Thereafter, the air is exhausted through the air outlets 743, thereby cooling the inside of the housing 7.

The air inlet 721 is an inlet port through which the air is taken in the housing body 71 (i.e., inside the housing 7). The air inlet 721 is provided through the top plate 72 of the housing body 71 as shown in FIG. 14 and communicates with the inside of the housing body 71. In this embodiment, the air inlet 721 is provided at a position so as to overlap with, or be located around, the gap 791 (see FIG. 21) between the second cover 78 and the intermediate cover 79 in a plan view.

Figure 20:
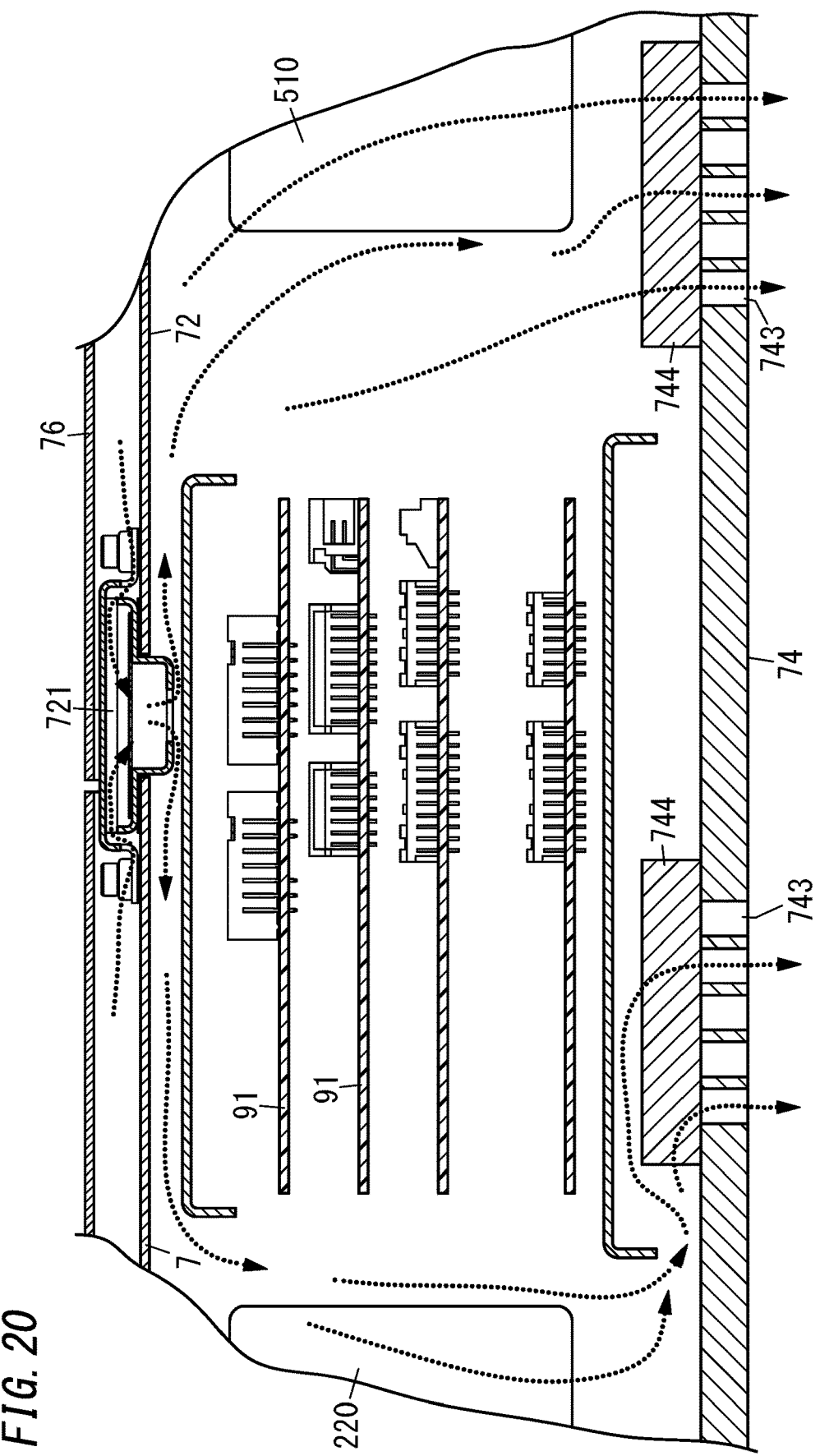
FIG. 20 is a cross-sectional view illustrating main parts inside the housing of the moving body.

The air outlets 743 are outlet ports, through which the air inside the housing body 71 is exhausted to the outside. As used herein, the "outside" refers to the space outside of the carrier 1, no matter whether it is an indoor space or an outdoor space. The air outlets 743 are provided below the air inlet 721. In this embodiment, the air outlets 743 are provided through the bottom plate 74 as shown in FIG. 20. Alternatively, the air outlets 743 may be provided through a side plate 73 of the housing body 71. Still alternatively, if there is a level difference on the upper surface of the top plate 72, then the air outlets 743 may also be provided through the top plate 72.

Meanwhile, suppose, unlike the carrier 1 according to this embodiment, the air inlet 721 were provided through the bottom plate 74 and the carrier 1 were configured to take in the air from the gap between the bottom plate 74 and the traveling surface 100. In that case, if the traveling surface 100 were wet or contaminated with dust, for example, then water, dust, and other foreign particles would be carried by the air taken in through the air inlet 721 and easily enter the housing 7.

In this embodiment, however, the air inlet 721 faces upward and the air outlets 743 are provided below the air inlet 721, thus reducing the chances of water, dust, and other foreign particles being taken in the housing 7. In other words, the carrier 1 according to this embodiment may reduce an increase in temperature inside the housing 7 while reducing the chances of the inside of the housing 7 being inundated with water.

In addition, the carrier 1 according to this embodiment further includes a plurality of (e.g., two in this example) fans 44 for forming a flow of the air (airflow) that is taken in the housing 7 from the outside of the carrier 1 through the air inlet 721, passes through the inside of the housing 7, and then is exhausted to the outside of the housing 7 through the air outlets 743 (see FIG. 19). In this embodiment, the fans 744 are arranged on the upper surface of the bottom plate 74 to face the plurality of air outlets 743. This allows the air to be taken in the housing 7 from the outside of the housing 7 and then exhausted from the inside of the housing 7 to the outside compulsorily.

In this embodiment, the carrier 1 includes the plurality of fans 744 which are provided one to one for the plurality of air outlets 743. However, this is only an example of the present disclosure and should not be construed as limiting. Alternatively, a single fan 744 may be provided for the plurality of air outlets 743. Still alternatively, a plurality of fans 744 may be provided for a single air outlet 743.

Figure 21:
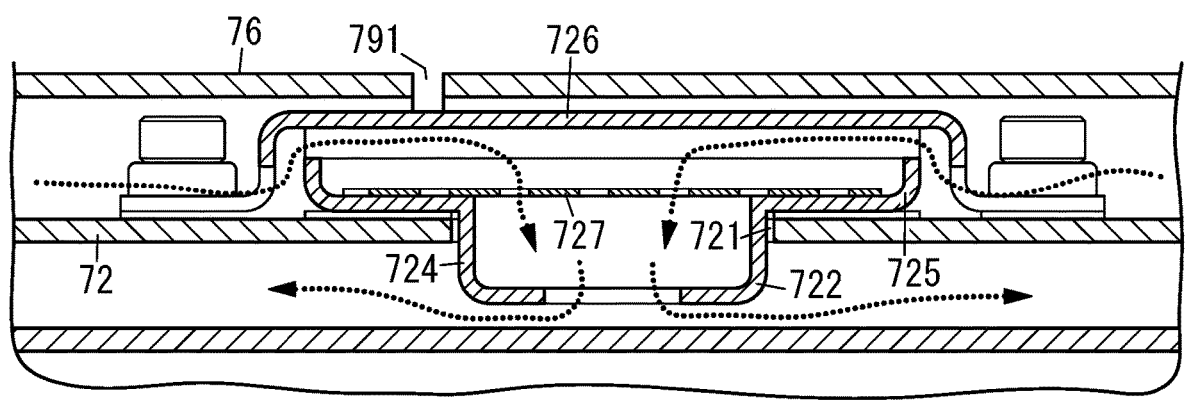
FIG. 21 is a cross-sectional view illustrating a portion around an air inlet of the moving body.

FIG. 21 is an enlarged view of the air inlet 721 and members surrounding the air inlet 721. To the air inlet 721, attached are an inner cover 722 with a dam portion 725, an outer cover 726, and a through hole plate 727 provided with a plurality of through holes.

A plurality of through holes (passage holes) are provided through the through hole plate 727. The through hole plate 727 allows the air to pass through while reducing the invasion of water, dust, and other foreign particles. The through hole plate 727 is put on the inner cover 722 and is arranged to cover the air inlet 721.

The inner cover 722 includes a fitting portion 724 to be fitted into the air inlet 721 and the dam portion 725 extended from the fitting portion 724 toward the outside of the air inlet 721. The dam portion 725 surrounds the air inlet 721 in a plan view. In this embodiment, the dam portion 725 is formed to be continuous over the entire outer periphery of the inner cover 722. The dam portion 725 protrudes above the upper surface of the top plate 72 of the housing body 71. Providing the dam portion 725 reduces the chances of water, dust, and other foreign particles being carried by the airflow and entering the housing 7.

In this embodiment, the dam portion 725 and the housing 7 are provided as two separate members. However, this is only an example of the present disclosure and should not be construed as limiting. Alternatively, the dam portion 725 may be, for example, welded to the housing 7. Still alternatively, the top plate 72 of the housing 7 may be subjected to embossing such that the dam portion 725 forms an integral part of the top plate 72 and surrounds the air inlet 721. In this embodiment, the dam portion 725 is continuous over the entire outer periphery of the air inlet 721. Alternatively, the dam portion 725 may be locally discontinued.

(1.2.11) Protector

The carrier 1 according to this embodiment includes a plurality of (e.g., two in this example) protectors 8 attached to the bottom plate 74 of the housing 7 as shown in FIG. 22. The plurality of protectors 8 are members for preventing the bottom surface of the housing 7 from coming into contact with the traveling surface 100. The protectors 8 are located at least partially between the metallic plate (e.g., the adjacent portions 742 in this example) of the housing 7 and the traveling surface 100.

As used herein, the phrase "between the metallic plate and the traveling surface 100" refers to the gap between the metallic plate and the traveling surface 100 in a situation where the bottom plate 74 has come rather close to the traveling surface 100. In this embodiment, the plurality of protectors 8 are attached to the bottom plate body 741 of the bottom plate 74. When the bottom plate 74 has come rather close to the traveling surface 100, the plurality of protectors 8 are interposed between the metallic plate and the traveling surface 100 to prevent the metallic plate from coming into contact with the traveling surface 100.

In this embodiment, the protector 8 are made of a resin, which is specifically white MC Nylon®. Alternatively, the protectors 8 may also be made of rubber, elastomer, urethane, nylon, phenol, polycarbonate, or any other suitable material. The protectors 8 do not have to have a block shape but may also be in the shape of a seal or a sheet, for example. The color of the protectors 8 is suitably similar to that of the traveling surface 100.

In this embodiment, the protectors 8 are fixed with a fixing member to the bottom plate 74. Each of the protectors 8 has a counterbored portion 81 to house the head portion of the fixing member. This makes, when the protectors 8 are attached to the bottom plate 74, the head portion of the fixing member not protruding from the surface (the bottom surface) of the protectors 8. This prevents the fixing member from coming into contact with the traveling surface 100. The counterbored portion 81 may be a deeply counterbored portion or a countersinking portion, for example.

In this embodiment, the protectors 8 are attached removably to the bottom plate 74. In this embodiment, the protectors 8 may be made removable by using a screw as the fixing member. The protectors 8 may be attached removably to the bottom plate 74 by fitting, hooking, adhesion, or insertion, for example, Each of the protectors 8 has a chamfered portion 82 at least on a front lower corner portion thereof in the forward/backward directions. In this embodiment, each of the protectors 8 also has a chamfered portion 83 at the rear lower corner portion thereof in the forward/backward directions. Each of the protectors 8 has a trapezoidal cross section, of which the width decreases downward.

The plurality of protectors 8 are attached to at least two corner portions of the bottom plate body 741 as shown in FIG. 15. As used herein, the two corner portions refer to the rear corner portions in the forward/backward directions of the bottom plate body 741. The plurality of protectors 8 are provided one to one for the plurality of corner portions. In addition, in this embodiment, when viewed from under the carrier 1 (hereinafter referred to as "in a bottom view"), the plurality of protectors 8 are arranged outside in the forward/backward directions of the auxiliary wheel 45. In this embodiment, the protectors 8 are arranged outside in the forward/backward directions of the rear auxiliary wheel 45 at a rear portion of the bottom plate body 741. However, this is only an example of the present disclosure and should not be construed as limiting. Alternatively, the protectors 8 may also be arranged outside in the forward/backward directions of the front auxiliary wheel 45 at a front portion of the bottom plate body 741. Still alternatively, the protectors 8 may also be arranged at all corner portions of the bottom plate body 741.

Furthermore, the protectors 8 are arranged outside in the forward/backward directions of the rear auxiliary wheel 45 at the rear portion of the bottom plate body 741. In the following description, the shock absorber mechanism 39 of the second auxiliary wheel unit 3B located at the rear end in the forward/backward directions will be hereinafter referred to as a "second shock absorber mechanism 39" and the shock absorber mechanism 39 of the first auxiliary wheel unit 3A located at the front end will be hereinafter referred to as a "first shock absorber mechanism 39." The distance D1 from the protectors 8 to the second shock absorber mechanism 39 is shorter than the distance D2 from the protectors 8 to the first shock absorber mechanism 39.

(1.3) Operation

Next, it will be described how the carrier 1 according to this embodiment operates.

(1.3.1) Basic Operation of Carrier

First, it will be described basically how the carrier 1 operates. In a steady state, the carrier 1 travels autonomously along the traveling surface 100 by driving the plurality of driving wheels 28 with the traction motors 220 controlled by the control unit 9. In this case, the carrier 1 travels autonomously along the traveling surface 100 in accordance with an electronic map stored in a memory (such as a memory of the control unit 9). The electronic map may be updated via wireless communication with an external system, for example. In addition, while traveling, the carrier 1 has the surroundings thereof detected by the detection unit 91. When the detection unit 91 detects any obstacle to its traveling, for example, the carrier 1 stops on the spot and waits until the obstacle is removed from the spot by a worker, for example. When the detection unit 91 no longer detects any obstacle, the carrier 1 starts traveling again.

Alternatively, when the detection unit 91 detects any obstacle to its traveling, the carrier 1 according to the present disclosure may travel autonomously to circumvent the obstacle to the extent of not deviating from its traveling route.

Also, if the carrier 1 has received a carry instruction, the carrier 1 is to be loaded with the burden X1 on reaching the location where the burden X1 is placed. Specifically, first, when the elevator units 70 are located at a lower limit level of their movable range, the carrier 1 slips into the gap under the burden X1. In this state, the elevator motors 510 are activated to elevate the elevator units 70 to an upper limit level of their movable range, thereby having the burden X1 lifted by the elevator units 70. In this manner, the burden X1 may be loaded onto the elevator units 70.

(1.3.2) Exemplary Operation

Based on the result of detection by the detection unit 91, the carrier 1 may operate, for example, in the following manner. In this embodiment, when the level difference sensors 93 detect any level difference on the traveling surface 100, the control unit 9 brings the carrier 1 to a halt by controlling the traction motors 220. Alternatively, when the level difference sensors 93 detect any level difference on the traveling surface 100, the carrier 1 may travel autonomously to circumvent the level difference by reversing or turning around.

Specifically, in this embodiment, when one of the plurality of level difference sensors 93 arranged at the four corners of the housing 7 detects any level difference with a predetermined height (of 35 mm, for example) or more, the traction motors 220 are stopped. When the pair of level difference sensors 93 provided at the front end, out of the four level difference sensors 93 arranged at the four corners of the housing 7, detects any level difference, the carrier 1 may be reversed. On the other hand, when only one of the pair of level difference sensors 93 provided at the front end detects any level difference, the carrier 1 may be turned around in the opposite direction from the level difference detected. Optionally, the operation of the carrier 1 may be defined as appropriate based on the results of detection obtained by a sonar sensor and the level difference sensors 93 in combination.

(1.3.3) Exemplary Elevate Operation by Elevator Units

The control unit 9 has the elevator units 70 elevated by activating the elevator motors 510 with the carrier 1 slipped into the gap under the burden X1. At this time, the control unit 9 has the first elevator unit 771 and the second elevator unit 781 elevated in synch with each other.

If the lower surface of the burden X1 has different shapes (e.g., if its portion facing the first elevator unit 771 is lower than another portion facing the second elevator unit 781), then the carrier 1 operates in the following manner. Specifically, the carrier 1 elevates the first elevator unit 771 and the second elevator unit 781 in synch with each other. Then, first, the loading sensor 95 provided for the first elevator unit 771 detects the burden X1. At this time, the loading sensor 95 provided for the second elevator unit 781 does not detect the burden X1 but the second elevator unit 781 continues to be elevated as it is for a certain period of time.

When the second elevator unit 781 is kept being elevated for the certain period of time, the burden X1 will be loaded onto the second elevator unit 781. Then, the loading sensor 95 provided for the second elevator unit 781 detects the burden X1 and the type of the burden X1 is determined as described above based on the time lag between the respective detection timings of the burden X1 by the loading sensors 95 with respect to the reference point in time, thus making the carrier 1 operate according to the type of the burden X1 determined. In this case, according to this embodiment, the first elevator unit 771 and the second elevator unit 781 are elevated to a predetermined degree (of 20 mm, for example).

If the loading sensor 95 provided for the second elevator unit 781 does not detect the burden X1 even when the second elevator unit 781 is kept being elevated for the certain period of time, then the second elevator unit 781 may stop being elevated. Alternatively, the second elevator unit 781 may stop being elevated once and then the first elevator unit 771 and the second elevator unit 781 may start being lowered.

Optionally, according to the type of the burden X1, the first elevator unit 771 and the second elevator unit 781 may be elevated to varying degrees or the traveling velocity of the moving body 1A may be changed. As can be seen from the foregoing description, according to this embodiment, the control unit 9 performs control to change the operation of the plurality of elevator units 70 based on the time lag between the respective detection timings of the burden X1 (load placed) by the loading sensors 95 with respect to the reference point in time.

(2) Variations

Note that the embodiment described above is only an exemplary one of various embodiments of the present disclosure and should not be construed as limiting. Rather, the exemplary embodiment described above may be readily modified in various manners depending on a design choice or any other factor without departing from the scope of the present disclosure. Variations of the exemplary embodiment will be enumerated one after another. Optionally, the variations to be described below may be adopted in combination as appropriate.

In the embodiment described above, the moving body 1A is implemented as a carrier 1. However, the moving body 1A does not have to be the moving body 1A designed to travel by turning its wheels 10 around a rotary axis parallel to the traveling surface 100. Examples of the moving body 1A include a moving body 1A designed to be propelled by a rack and pinion mechanism and a moving body 1A designed to be propelled by traction of a wire.

The moving body 1A refers to various types of moving bodies including automated guided vehicles (AGVs), moving robots, and drones. As used herein, the "moving robot" refers to any of various types of robots including wheeled (10) robots and crawler (451) robots. The moving body 1A may have not only the function of traveling within the predetermined area but also various other functions including carrying, picking, welding, mounting, displaying, greeting customers, security guarding, assembling, and testing.

In the embodiment described above, the drive source 22 for causing the moving body 1A to travel along the traveling surface 100 is the traction motor 220. However, this is only an example of the present disclosure and should not be construed as limiting. Alternatively, the drive source 22 may also be a linear actuator and does not have to be a motor. The same statement applies to the elevator motors 510 as well.

Also, in the embodiment described above, the driving wheels 28 are arranged between the two auxiliary wheels 45. Alternatively, one driving wheel 28 may be arranged between the two auxiliary wheels 45 and another driving wheel 28 may be arranged outside of the two auxiliary wheels 45. Still alternatively, the auxiliary wheels 45 and the driving wheels 28 may also be arranged alternately in the forward/backward directions.

Furthermore, in the embodiment described above, the carrier 1 includes, as an auxiliary wheel 45 arranged forward of the driving wheels 28, a single auxiliary wheel 45 arranged in the middle in the rightward/leftward directions. Alternatively, the carrier 1 may include a plurality of auxiliary wheels 45 arranged forward of the driving wheels 28 and spaced apart from each other in the rightward/leftward directions. In the same way, the carrier 1 may include, as the auxiliary wheel 45 arranged backward of the driving wheels 28, a plurality of auxiliary wheels 45 spaced apart from each other in the rightward/leftward directions.

Furthermore, in the embodiment described above, the carrier 1 includes four buffer springs 44. However, this is only an example of the present disclosure and should not be construed as limiting. Alternatively, the carrier 1 may include only a pair of buffer springs 44 arranged diagonally. Still alternatively, the carrier 1 may include only one buffer spring 44 arranged at the center of the movable frame 40 in a plan view. That is to say, at least one buffer spring 44 needs to be provided.

The carrier 1 according to the embodiment described above supports, over the traveling surface 100, the housing 7 on the wheels 10. The rotary axis R1 of the wheels 10 extends in the horizontal direction as described above. The carrier 1 according to the embodiment described above includes, as the plurality of wheels 10, a plurality of (e.g., two in the example described above) driving wheels 28 and a plurality of (e.g., two in the example described above) auxiliary wheels 45. However, this is only an example of the present disclosure and should not be construed as limiting. Alternatively, all of the plurality of wheels 10 may be driving wheels 28. Still alternatively, one of the plurality of wheels 10 may be a driving wheel 28, and the other wheels may be auxiliary wheels 45. Yet alternatively, one of the plurality of wheels 10 may be an auxiliary wheel 45 and the other wheels 10 may be driving wheels 28.

Furthermore, in the embodiment described above, the auxiliary wheel 45 is a wheel 10. However, this is only an example of the present disclosure and should not be construed as limiting. Rather, the "auxiliary wheel 45" as used herein may also be a sphere designed to roll on the traveling surface 100.

The carrier 1 (moving body 1A) according to the present disclosure includes a computer system. In that case, the computer system may include, as major hardware components, a processor and a memory. The functions of the carrier 1 (moving body 1A) according to the present disclosure may be performed by making the processor execute a program stored in the memory of the computer system. The program may be stored in advance in the memory of the computer system. Alternatively, the program may also be downloaded through a telecommunications line or be distributed after having been recorded in some non-transitory storage medium such as a memory card, an optical disc, or a hard disk drive, any of which is readable for the computer system. The processor of the computer system may be made up of a single or a plurality of electronic circuits including a semiconductor integrated circuit (IC) or a large-scale integrated circuit (LSI). As used herein, the "integrated circuit" such as an IC or an LSI is called by a different name depending on the degree of integration thereof. Examples of the integrated circuits include a system LSI, a very large-scale integrated circuit (VLSI), and an ultra-large-scale integrated circuit (VLSI). Optionally, a field-programmable gate array (FPGA) to be programmed after an LSI has been fabricated or a reconfigurable logic device allowing the connections or circuit sections inside of an LSI to be reconfigured may also be adopted as the processor. Those electronic circuits may be either integrated together on a single chip or distributed on multiple chips, whichever is appropriate. Those multiple chips may be integrated together in a single device or distributed in multiple devices without limitation. As used herein, the "computer system" includes a microcontroller having one or more processors and one or more memories. Therefore, the microcontroller may also be implemented as a single or a plurality of electronic circuits including a semiconductor integrated circuit or a large-scale integrated circuit.

Also, in the present disclosure, expressions with an adverb "generally" are sometimes used as in the phrases such as "generally parallel" and "generally perpendicular." For example, "generally parallel" herein refers to the state of being substantially "parallel," which naturally covers a situation where something is exactly parallel to something else but may also cover a situation where the former is substantially parallel to the latter with a tolerance of about a few percent. The same statement is applied to other expressions with "generally."

Furthermore, as used herein, the phrases respectively meaning the end itself of a member and a part, including not only the end but also a region around the end, of the member (such as a "tip" and a "tip portion") refer to two different parts of the same member. For example, the "tip portion" of a member herein refers to a part, covering a certain range including the "tip," of the member. The same statement herein applies to the other similar phrases including an "end" and an "end portion."

(3) Aspects

As can be seen from the foregoing description, a moving body (1A) according to a first aspect includes a housing (7), a traction motor (220), and a battery (92). The traction motor (220) allows the housing (7) to travel along a traveling surface (100). The battery (92) supplies electric power to the traction motor (220). In the moving body (1A), the traction motor (220) and the battery (92) are arranged at different positions when viewed perpendicularly to the traveling surface (100).

This aspect allows a dimension of the housing (7) as measured perpendicularly to the traveling surface (100) to be reduced as much as possible because the traction motor (220) and the battery (92) do not overlap with each other when viewed perpendicularly to the traveling surface (100).

A moving body (1A) according to a second aspect, which may be implemented in conjunction with the first aspect, further includes at least one elevator motor (510) for actuating an elevator unit (70) that may be elevated and lowered with respect to the traveling surface (100). The elevator motor (510), the traction motor (220), and the battery (92) are distributed when viewed perpendicularly to the traveling surface (100).

This aspect allows a dimension of the housing (7) as measured perpendicularly to the traveling surface (100) to be reduced as much as possible, because the elevator motor (510), the traction motor (220), and the battery (92) do not overlap with each other when viewed perpendicularly to the traveling surface (100).

In a moving body (1A) according to a third aspect, which may be implemented in conjunction with the second aspect, the at least one elevator motor (510) includes a plurality of elevator motors (510). A traveling direction defined by the traction motor (220) is at least one of forward and backward directions. The plurality of elevator motors (510) are separated from each other in the forward and backward directions.

This aspect allows a dimension of the housing (7) as measured perpendicularly to the track surface (i.e., traveling surface (100)) to be reduced as much as possible, even though a plurality of elevator motors (510) are arranged.

In a moving body (1A) according to a fourth aspect, which may be implemented in conjunction with the third aspect, the traction motor (220) is arranged between the plurality of elevator motors (510).

This aspect allows a dimension of the housing (7) as measured perpendicularly to the traveling surface (100) to be reduced as much as possible, even though a plurality of elevator motors (510) and the traction motor (220) are arranged.

In a moving body (1A) according to a fifth aspect, which may be implemented in conjunction with any one of the first to fourth aspects, the traction motor (220) and the battery (92) at least partially overlap with each other when viewed parallel to the traveling surface (100).

This aspect allows the traction motor (220) and the battery (92) to be aggregated together in the direction perpendicular to the traveling surface (100), thus enabling the dimension of the housing (7) as measured perpendicularly to the traveling surface (100) to be reduced as much as possible.

A moving body (1A) according to a sixth aspect, which may be implemented in conjunction with any one of the first to fifth aspects, further includes at least one level difference sensor (93) to detect a level difference on the traveling surface (100). The level difference sensor (93), the traction motor (220), and the battery (92) are distributed when viewed perpendicularly to the traveling surface (100).

This aspect reduces, even when a plurality of level difference sensors (93) are provided, the chances of the dimension of the housing (7) as measured perpendicularly to the traveling surface (100) increasing significantly.

In a moving body (1A) according to a seventh aspect, which may be implemented in conjunction with the sixth aspect, a traveling direction defined by the traction motor (220) is at least one of forward and backward directions. The moving body (1A) includes at least four level difference sensors (93). The at least four level difference sensors (93) are arranged at both ends in the forward and backward directions of the moving body (1A) so as to be separated from each other in a direction intersecting with the forward and backward directions. Specifically, two of the four level difference sensors (93) are arranged at a front end in the forward and backward directions of the moving body (1A) and a direction in which the two level difference sensors (93) are arranged side by side intersects with the forward and backward directions. The other two level difference sensors (93) are arranged at a rear end in the forward and backward directions of the moving body (1A) and a direction in which the two level difference sensors (93) are arranged side by side intersects with the forward and backward directions.

This aspect allows, even when the moving body (1A) travels in any direction along the traveling surface (100), any level difference on the traveling surface (100) to be detected.

In a moving body (1A) according to an eighth aspect, which may be implemented in conjunction with the sixth or seventh aspect, the at least one level difference sensor (93) is an optical sensor arranged on a bottom plate (74) of the housing (7) and configured to detect the level difference by irradiating the traveling surface (100) with light. A surface, facing the traveling surface (100), of the housing (7) has at least one hole (745) to pass the light therethrough.

This aspect allows the level difference sensor (93) to be arranged on the bottom plate (74) of the housing (7), thus enabling the moving body (1A) to be downsized parallel to the traveling surface (100).

A moving body (1A) according to a ninth aspect, which may be implemented in conjunction with any one of the first to eighth aspects, is a carrier (1) to be loaded with a burden (X1) placed on an elevator unit (70). The elevator unit (70) may be elevated and lowered with respect to the traveling surface (100).

This aspect allows a moving body (1A), of which the dimension as measured perpendicularly to the traveling surface (100) is reduced significantly, to be used as a carrier (1).

A moving body (1A) according to a tenth aspect, which may be implemented in conjunction with any one of the first to eighth aspects, further includes a plurality of elevator units (70). Each of the plurality of elevator units (70) is configured to be elevated and lowered with respect to the traveling surface (100) and be loaded with a burden (X1) placed thereon. The plurality of elevator units (70) are configured to be elevated and lowered independently of each other.

This aspect allows the elevator unit (70) to be elevated according to the shape of the lower surface of the burden (X1), thus enabling multiple types of burdens (X1) with mutually different lower surface shapes to be lifted with good stability.

A moving body (1A) according to an eleventh aspect, which may be implemented in conjunction with any one of the first to tenth aspects, further includes at least one driving wheel (28), at least one auxiliary wheel (45), and at least one shock absorber mechanism (39). The driving wheel (28) is driven with motive power transmitted from a drive source (22). The auxiliary wheel (45) aids the moving body (1A) in traveling on the driving wheel (28). The shock absorber mechanism (39) absorbs shock provided by the auxiliary wheel (45).

This aspect allows the moving body (1A) to travel with good stability even when the traveling surface (100) has some unevenness.

A moving body (1A) according to a twelfth aspect, which may be implemented in conjunction with any one of the first to eleventh aspects, further includes: a driving wheel (28) to support the housing (7) on the traveling surface (100); and a drive source (22) arranged in the housing (7) and configured to drive the driving wheel (28). The housing (7) has: at least one air inlet (721) provided to be open in an upward direction; and at least one air outlet (743). The air outlet (743) communicates with the air inlet (721) and is provided below the air inlet (721).

This aspect may reduce an increase in the temperature of the drive source (22) arranged inside the housing (7) while reducing the chances of the inside of the housing (7) being inundated with water.

A moving body (1A) according to a thirteenth aspect, which may be implemented in conjunction with any one of the first to twelfth aspects, further includes at least one protector (8) made of a resin. The housing (7) has a bottom plate (74) arranged to face the traveling surface (100) and configured at least partially as a metallic plate. At least part of the protector (8) is located between the metallic plate and the traveling surface (100).

This aspect reduces the chances of the metallic plate coming into contact with the traveling surface (100), thus reducing the damage to be caused to at least one of the traveling surface (100) or the bottom plate (74).

A moving body (1A) according to a fourteenth aspect, which may be implemented in conjunction with the tenth aspect, further includes a plurality of elevator mechanisms (5) provided one to one for the plurality of elevator units (70). Each of the plurality of elevator mechanisms (5) includes: a plurality of supporting mechanisms (56) for supporting an associated one of the plurality of elevator units (70) to actuate the one elevator unit (70) in an elevating direction; and one drive source (51) for actuating the plurality of supporting mechanisms (56).

This aspect allows each elevator unit (70) to be actuated with good stability in the elevating direction.

A moving body (1A) according to a fifteen aspect, which may be implemented in conjunction with the tenth or fourteenth aspect, further includes an intermediate cover (79) to interconnect the plurality of elevator units (70) together.

This aspect reduces the chances of an object being clamped accidentally while each elevator unit (70) is being actuated.

A moving body (1A) according to a sixteenth aspect, which may be implemented in conjunction with any one of the tenth, fourteenth, or fifteen aspect, further includes a plurality of loading sensors (95) for detecting that the burden (X1) has been loaded on each of the plurality of elevator units (70).

This aspect makes it possible to detect that the burden (X1) has been loaded on each elevator unit (70) when the elevator unit (70) is elevated.

In a moving body (1A) according to a seventeenth aspect, which may be implemented in conjunction with the sixteenth aspect, each of the plurality of loading sensors (95) is a noncontact sensor.

This aspect reduces, even when shock is transmitted from, for example, the burden (X1) to the elevator unit (70), the chances of causing damage to the loading sensors (95).

In a moving body (1A) according to an eighteenth aspect, which may be implemented in conjunction with any one of the tenth and fourteenth to seventeenth aspects, the plurality of elevator units (70) has their operation changed based on a time lag between respective timings when loading of the burden (X1) is detected by the plurality of loading sensors (95) with respect to a reference point in time.

This aspect allows operation to be performed adaptively on multiple different types of burdens (X1) with mutually different lower surface shapes.

A moving body (1A) according to a nineteenth aspect, which may be implemented in conjunction with any one of the tenth and fourteenth to eighteenth aspects, includes a first elevator unit (771) and a second elevator unit (781). The first elevator unit (771) is one of the plurality of elevator units (70). The second elevator unit (781) is another one of the plurality of elevator units (70) and is arranged separately from the first elevator unit (771).

This aspect allows a burden (X1), of which the dimension is relatively large parallel to the traveling surface (100), to be lifted with good stability.

A moving body (1A) according to a twentieth aspect, which may be implemented in conjunction with the eleventh aspect, includes no shock absorber mechanism (39) to absorb the shock provided by the driving wheel (28).

Providing the shock absorber mechanism (39) for the driving wheel (28) would inevitably cause an increase in the dimension as measured in the upward/downward direction of the moving body (1A). However, this aspect allows the shock to be absorbed into the auxiliary wheel (45), thus allowing the dimension of the moving body (1A) as measured in the upward/downward direction to be reduced.

A moving body (1A) according to a twenty-first aspect, which may be implemented in conjunction with the eleventh or twentieth aspect, includes a plurality of auxiliary wheels (45) and a plurality of shock absorber mechanisms (39). Each of the plurality of shock absorber mechanisms (39) includes at least one buffer spring (44). The shock absorber mechanism (39) associated with any one of the plurality of auxiliary wheels (45) and the shock absorber mechanism (39) associated with another one of the plurality of auxiliary wheels (45) have buffer springs (44) with mutually different total deflections.

This aspect allows the deflection to be reduced in a part of the moving body (1A) that should have its deflection decreased while ensuring sufficient deflection for the moving body (1A) as a whole.

In a moving body (1A) according to a twenty-second aspect, which may be implemented in conjunction with the twenty-first aspect, the driving wheel (28) is arranged between the plurality of auxiliary wheels (45).

This aspect allows the auxiliary wheels (45) to be arranged in good balance.

A moving body (1A) according to a twenty-third aspect, which may be implemented in conjunction with any one of the eleventh and twentieth to twenty-second aspects, further includes an auxiliary wheel supporting member (34). The auxiliary wheel supporting member (34) rotatably supports the auxiliary wheel (45) around a rotary shaft extending along the traveling surface (100) and is rotatable around an axis perpendicular to the traveling surface (100).

This aspect allows the auxiliary wheel (45) to be turned according to the behavior of the driving wheel (28), thus enabling the moving body (1A) to operate appropriately.

In a moving body (1A) according to a twenty-fourth aspect, which may be implemented in conjunction with the twelfth aspect, the air outlet (743) is provided through a bottom surface of the housing (7).

This aspect reduces, even when the traveling surface (100) is wet, the chances of the housing (7) being inundated with water through the air outlet (743).

A moving body (1A) according to a twenty-fifth aspect, which may be implemented in conjunction with the twelfth or twenty-fourth aspect, further includes at least one fan (744) which produces an air flow to be taken in the housing (7) through the air inlet (721) and exhausted through the air outlet (743).

This aspect allows the air to be taken in the housing (7) through the air inlet (721) and exhausted through the air outlet (743) compulsorily, thus reducing an increase in the temperature of the drive source (51) and other members in the housing (7) while further reducing the chances of the inside of the housing (7) being inundated with water.

A moving body (1A) according to a twenty-sixth aspect, which may be implemented in conjunction with any one of the twelfth, twenty-fourth, or twenty-fifth aspect, further includes a dam portion (725) surrounding the air inlet (721).

This aspect reduces the chances of water entering the housing (7) through the air inlet (721).

In a moving body (1A) according to a twenty-seventh aspect, which may be implemented in conjunction with any one of the twelfth and twenty-fourth to twenty-sixth aspects, the housing (7) includes a plurality of air outlets (743).

This aspect allows the flow rate of the air exhausted to be increased, compared to a situation where only one air outlet (743) is provided.

In a moving body (1A) according to a twenty-eighth aspect, which may be implemented in conjunction with the thirteenth aspect, the protector (8) is fixed onto the bottom plate (74) with at least one fixing member.

This aspect allows the protector (8) to be fixed more firmly.

In a moving body (1A) according to a twenty-ninth aspect, which may be implemented in conjunction with the twenty-eighth aspect, the protector (8) includes a counterbored portion (81) to house a head portion of the fixing member.

This aspect prevents the head portion of the fixing member from protruding from the protector (8), thus reducing the chances of the track surface being scratched with the head portion of the fixing member.

In a moving body (1A) according to a thirtieth aspect, which may be implemented in conjunction with any one of the thirteenth, twenty-eighth, or twenty-ninth aspect, the protector (8) is attached removably to the housing (7).

This aspect allows the protector (8) to be replaced when the protector (8) is worn out.

A moving body (1A) according to a thirty-first aspect, which may be implemented in conjunction with any one of the thirteenth and twenty-eighth to thirtieth aspects, includes a plurality of protectors (8). The bottom plate (74) includes a bottom plate body 741 with a plurality of corner portions and at least one adjacent portion (742) which is a metallic plate provided adjacent to the plurality of corner portions. The plurality of protectors (8) are provided for the plurality of corner portions.

This aspect allows at least one of the traveling surface (100) or the bottom plate (74) to be protected appropriately.

A moving body (1A) according to a thirty-second aspect, which may be implemented in conjunction with any one of the thirteenth and twenty-eighth to thirty-first aspects, further includes a plurality of wheels (10) arranged to support the housing (7) on the traveling surface (100) and spaced apart from each other in a traveling direction. The protector (8) is arranged outside of the wheels (10) in the traveling direction.

This aspect allows, when the bottom plate (74) is tilted, at least one of the traveling surface (100) or the bottom plate (74) to be protected appropriately by the protector (8).

A moving body (1A) according to a thirty-third aspect, which may be implemented in conjunction with the thirty-second aspect, further includes at least two shock absorber mechanisms (39) for absorbing the shock provided by at least two wheels (10) out of the plurality of wheels (10). One of the at least two shock absorber mechanisms (39) is a first shock absorber mechanism having at least one buffer spring (44). The other of the at least two shock absorber mechanisms (39) is a second shock absorber mechanism having a buffer spring (44) with a smaller total deflection than the former buffer spring (44). A distance (D1) between each of the plurality of protectors (8) and the first shock absorber mechanism is shorter than a distance (D2) between each of the plurality of protectors (8) and the second shock absorber mechanism.

This aspect allows the moving body (1A), including shock absorber mechanisms (39), of which the respective buffer springs (44) have different total deflections, to protect at least one of the traveling surface (100) or the bottom plate (74) appropriately.

In a moving body (1A) according to a thirty-fourth aspect, which may be implemented in conjunction with any one of the thirteenth and twenty-eighth to thirty-third aspects, the plurality of protectors (8) are arranged in a rear portion of the housing (7).

This aspect allows, even when a rear portion of the moving body (1A) comes rather close to the traveling surface (100) while the moving body (1A) is rushing, at least one of the traveling surface (100) or the bottom plate (74) to be protected appropriately.

In a moving body (1A) according to a thirty-fifth aspect, which may be implemented in conjunction with any one of the thirteenth and twenty-eighth to thirty-fourth aspects, the protector (8) has its front lower corner portion chamfered.

This aspect allows, even when the protector (8) comes into contact with the traveling surface, the protector (8) to make a plane contact with the traveling surface.

Note that constituent elements according to the second through thirty-fifth aspects are not essential constituent elements for the moving body (1A) but may be omitted as appropriate.

REFERENCE SIGNS LIST

1 Carrier
1A Moving Body
10 Wheel
22 Drive Source
220 Traction Motor
28 Driving Wheel
39 Shock Absorber Mechanism
45 Auxiliary Wheel
510 Elevator Motor
7 Housing
70 Elevator Unit
721 Air Inlet
74 Bottom Plate
743 Air Outlet
8 Protector
92 Battery
93 Level Difference Sensor
100 Traveling Surface
X1 Burden

What is claimed is:

1. A moving body comprising:
a housing;
a traction motor configured to allow the housing to travel along a traveling surface;
a plurality of elevator motors configured to actuate at least one elevator unit, the at least one elevator unit being configured to be elevated and lowered with respect to the traveling surface; and
a battery configured to supply electric power to the traction motor and the plurality of elevator motors,
a traveling direction defined by the traction motor being at least one of forward and backward directions,
the traction motor and the battery being arranged between the plurality of elevator motors in the traveling direction,
the moving body further comprising at least one driving wheel to support the housing on the traveling surface,
the plurality of elevator motors, the traction motor, and the battery falling within a range defined by a diameter of the at least one driving wheel measured in a direction perpendicular to the traveling surface.

2. The moving body of claim 1, wherein
the traction motor and the battery at least partially overlap with each other when viewed parallel to the traveling surface.

3. The moving body of claim 1, further comprising at least one level difference sensor configured to detect a level difference on the traveling surface, wherein
the level difference sensor, the traction motor, and the battery are distributed when viewed perpendicularly to the traveling surface.

4. The moving body of claim 3, wherein
the at least one level difference sensor includes at least four level difference sensors, and
the at least four level difference sensors are arranged at both ends in the forward and backward directions so as to be separated from each other in a direction intersecting with the forward and backward directions.

5. The moving body of claim 3, wherein
the at least one level difference sensor is an optical sensor arranged on a bottom plate of the housing and configured to detect the level difference by irradiating the traveling surface with light, and
a surface, facing the traveling surface, of the housing has at least one hole configured to pass the light therethrough.

6. The moving body of claim 1, wherein
the moving body is a carrier configured to be loaded with a burden placed on the at least one elevator unit.

7. The moving body of claim 1, wherein
the at least one elevator unit comprises a plurality of elevator units, each of the plurality of elevator units being configured to be elevated and lowered with respect to the traveling surface independently of each other and be loaded with a burden placed thereon; and
an intermediate cover configured to interconnect the plurality of elevator units together.

8. The moving body of claim 1, wherein
the at least one elevator unit comprises a plurality of elevator units, each of the plurality of elevator units being configured to be elevated and lowered with respect to the traveling surface independently of each other and be loaded with a burden placed thereon; and
a plurality of loading sensors configured to detect that the burden is loaded on each of the plurality of elevator units.

9. The moving body of claim 8, wherein
the plurality of elevator units has their operation changed based on a time lag between respective timings when loading of the burden is detected by the plurality of loading sensors with respect to a reference point in time.

10. The moving body of claim 1, further comprising:
a plurality of auxiliary wheels configured to aid the moving body in traveling on the at least one driving wheel; and
a plurality of shock absorber mechanisms configured to absorb shock provided by the auxiliary wheel, each of the plurality of shock absorber mechanisms including at least one buffer spring, one of the plurality of shock absorber mechanisms associated with any one of the plurality of auxiliary wheels and another one of the plurality of shock absorber mechanisms associated with another one of the plurality of auxiliary wheels having buffer springs with mutually different total deflections.

11. The moving body of claim 1, further comprising a drive source arranged in the housing and configured to drive the at least one driving wheel, wherein the housing has:

at least one air inlet provided to be open in an upward direction; and at least one air outlet communicating with the air inlet and provided below the air inlet.

12. The moving body of claim 1, further comprising at least one protector made of a resin, the housing having a bottom plate arranged to face the traveling surface and configured at least partially as a metallic plate, at least part of the protector being located between the metallic plate and the traveling surface, the bottom plate and the protector being made of different materials.

13. The moving body of claim 1, wherein the at least one elevator unit comprises a plurality of elevator units, each of the plurality of elevator units being configured to be elevated and lowered with respect to the traveling surface independently of each other and be loaded with a burden placed thereon, the housing has four corners, and four of the plurality of elevator units are arranged in four corners of the housing, respectively.

14. A moving body comprising:

a housing having four corners;

a traction motor configured to allow the housing to travel along a traveling surface;

a plurality of elevator units, each of the plurality of elevator units being configured to be elevated and lowered with respect to the traveling surface independently of each other and be loaded with a burden placed thereon;

a plurality of elevator motors configured to actuate the plurality of elevator units; and a battery configured to supply electric power to the traction motor and the plurality of elevator motors, a traveling direction defined by the traction motor being at least one of forward and backward directions, four of the plurality of elevator units being arranged in four corners of the housing, respectively, the traction motor and the battery being arranged between the plurality of elevator motors in the traveling direction.

* * * * *